United States Patent
Kang et al.

(10) Patent No.: US 10,289,223 B2
(45) Date of Patent: May 14, 2019

(54) MOBILE TERMINAL AND METHOD FOR CONTROLLING THE SAME

(71) Applicant: LG ELECTRONICS INC., Seoul (KR)

(72) Inventors: Shinnyue Kang, Seoul (KR); Moonkyung Kim, Seoul (KR); Jeongyun Heo, Seoul (KR); Jihye Ham, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 15/348,146

(22) Filed: Nov. 10, 2016

(65) Prior Publication Data

US 2017/0139496 A1    May 18, 2017

(30) Foreign Application Priority Data

Nov. 16, 2015 (KR) .................. 10-2015-0160165

(51) Int. Cl.
  *G06F 3/041* (2006.01)
  *G06F 3/0488* (2013.01)
  *G06F 3/0484* (2013.01)

(52) U.S. Cl.
  CPC ............ *G06F 3/041* (2013.01); *G06F 3/0484* (2013.01); *G06F 3/0488* (2013.01); *G06F 3/04886* (2013.01)

(58) Field of Classification Search
  CPC ........... G06F 3/017; G06F 2203/04107; G06F 3/04886
  USPC ................................. 345/173–178
  See application file for complete search history.

(56) References Cited

U.S. PATENT DOCUMENTS

| | | | | |
|---|---|---|---|---|
| 2010/0117993 A1* | 5/2010 | Kent | ...................... | G06F 3/0418 345/177 |
| 2010/0211904 A1* | 8/2010 | Yun | ........................ | G06F 3/0236 715/773 |
| 2010/0277439 A1 | 11/2010 | Charlier et al. | | |
| 2012/0256854 A1* | 10/2012 | Lee | ........................ | G06F 1/1643 345/173 |
| 2013/0169568 A1* | 7/2013 | Park | ....................... | G06F 3/0488 345/173 |
| 2013/0201176 A1* | 8/2013 | Lee | ......................... | G09G 5/003 345/214 |
| 2013/0314453 A1* | 11/2013 | Ko | ............................ | G09G 5/10 345/690 |
| 2014/0139559 A1* | 5/2014 | Yoo | ......................... | G06F 3/147 345/690 |
| 2014/0320946 A1 | 10/2014 | Tomkins et al. | | |
| 2015/0042580 A1* | 2/2015 | Shim | ....................... | G06F 3/017 345/173 |

(Continued)

FOREIGN PATENT DOCUMENTS

KR    10-2015-0047191    5/2015

OTHER PUBLICATIONS

International Search Report and Written Opinion in International Application No. PCT/KR2016/009117, dated Dec. 8, 2016, 14 pages.

*Primary Examiner* — Roy P Rabindranath
(74) *Attorney, Agent, or Firm* — Fish & Richardson P.C.

(57) ABSTRACT

The present invention relates to a mobile terminal and a method of controlling the same. The present invention provides a mobile terminal which can control transparency of at least part of a display having controllable transparency through user touch interaction, and a method of controlling the mobile terminal.

16 Claims, 49 Drawing Sheets

(56) References Cited

U.S. PATENT DOCUMENTS

2015/0062175 A1 3/2015 Kim
2015/0205451 A1 7/2015 Lee

* cited by examiner

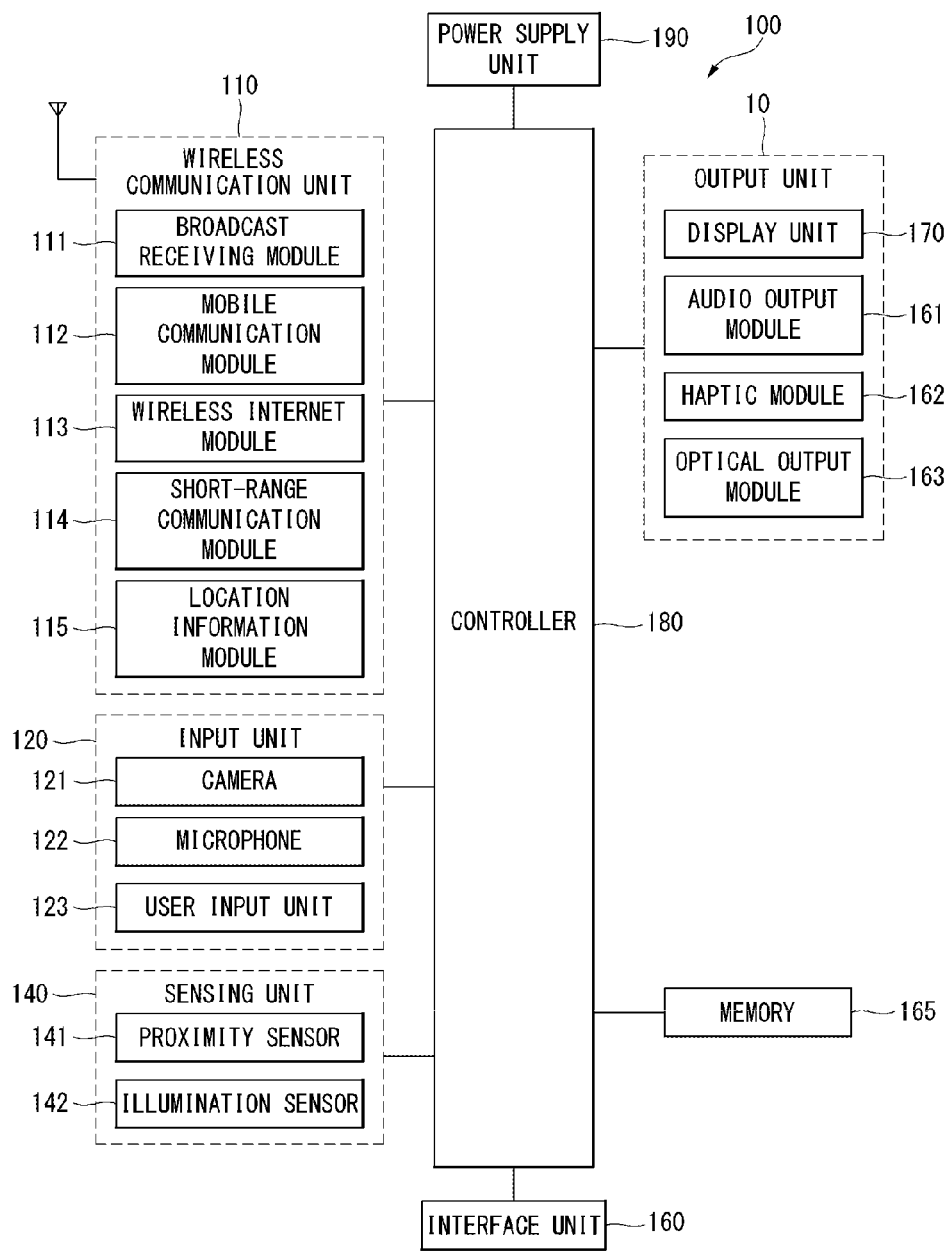

FIG. 3
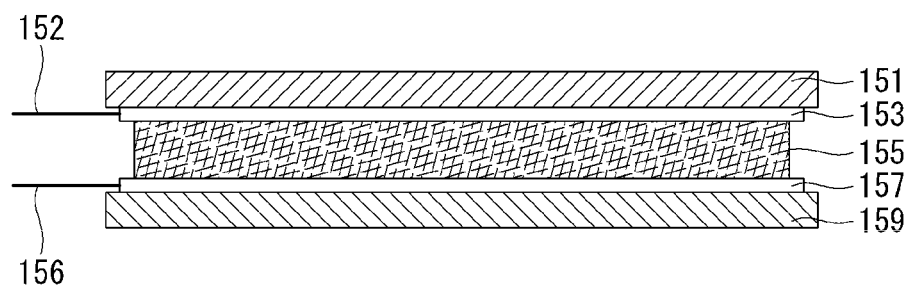
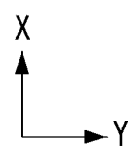

FIG. 7
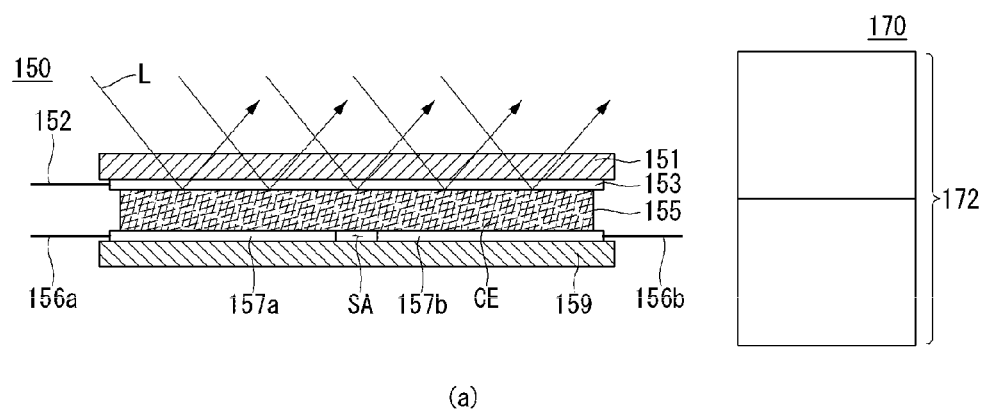
(a)
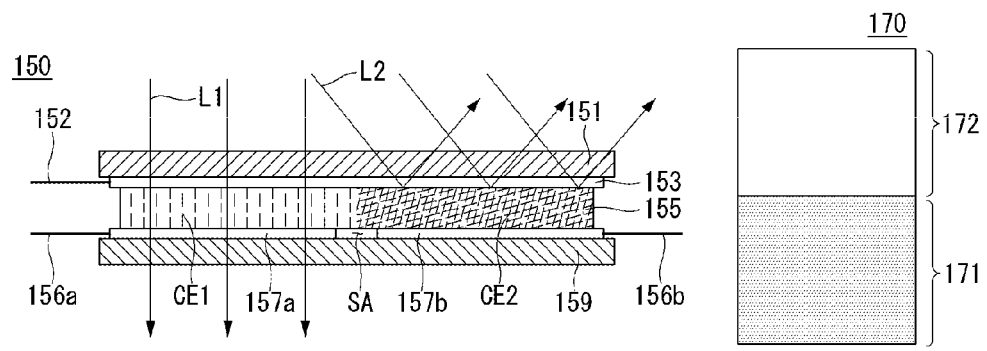
(b)

FIG. 9
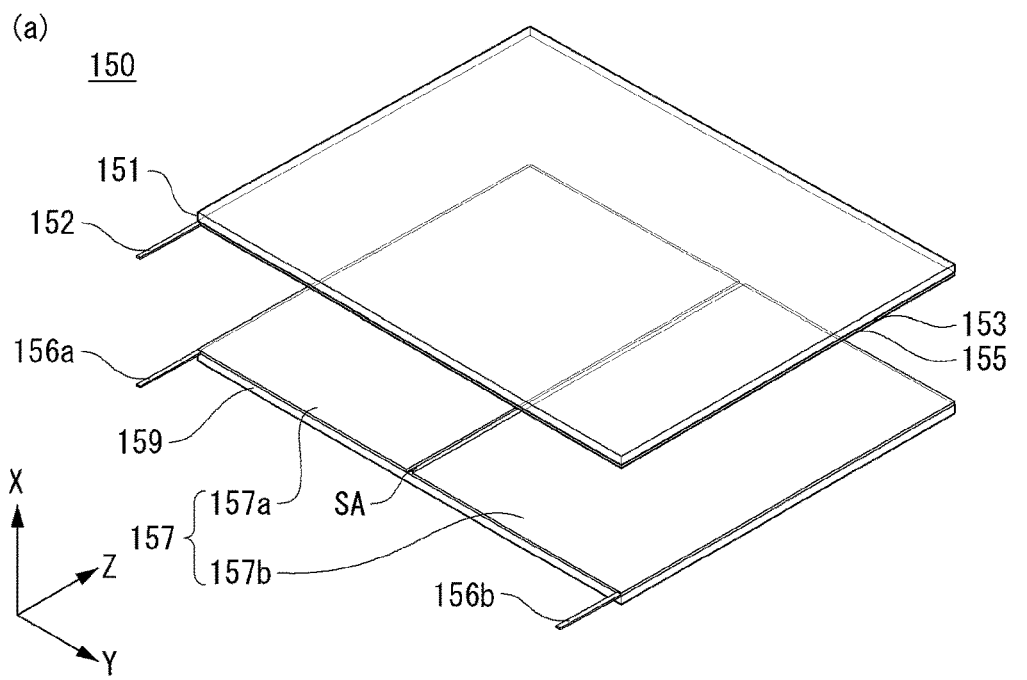
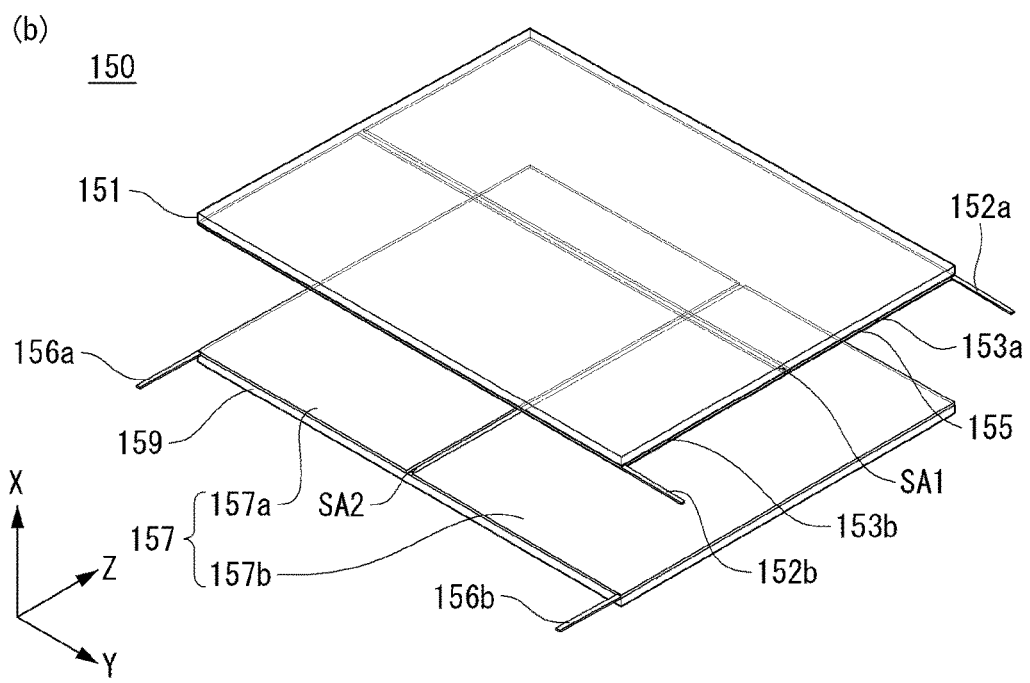

FIG. 16
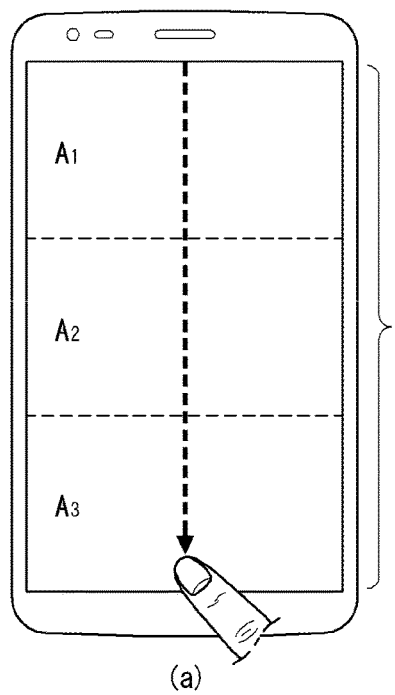
(a)
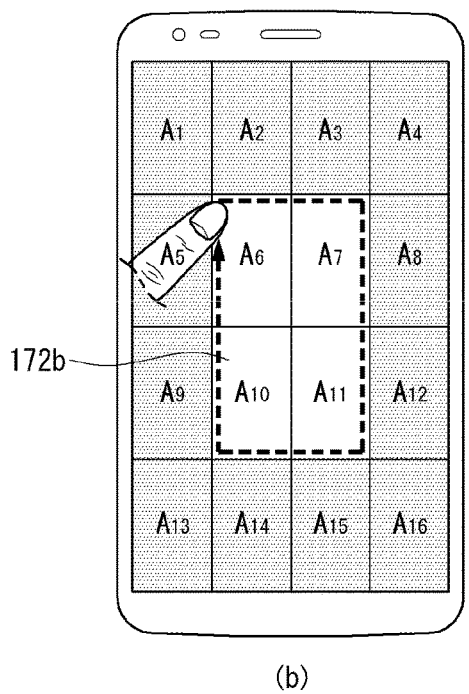
(b)
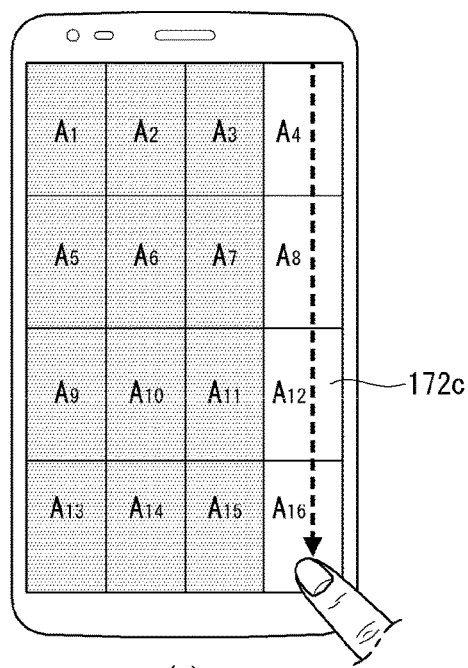
(c)
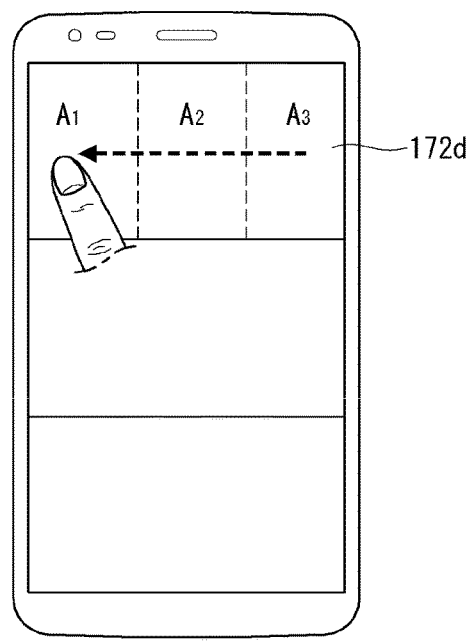
(d)

FIG. 17
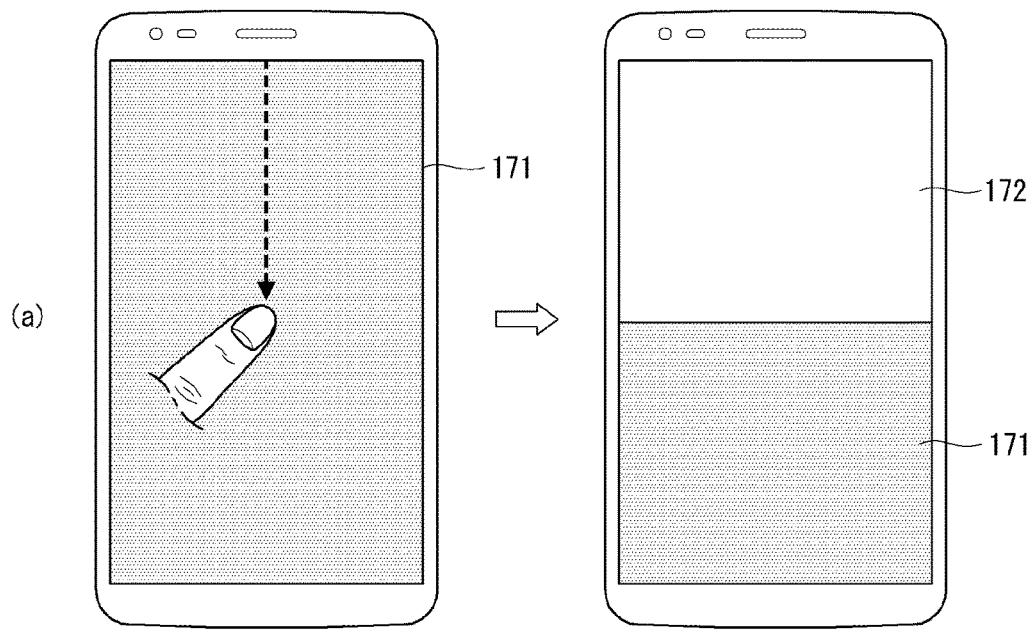
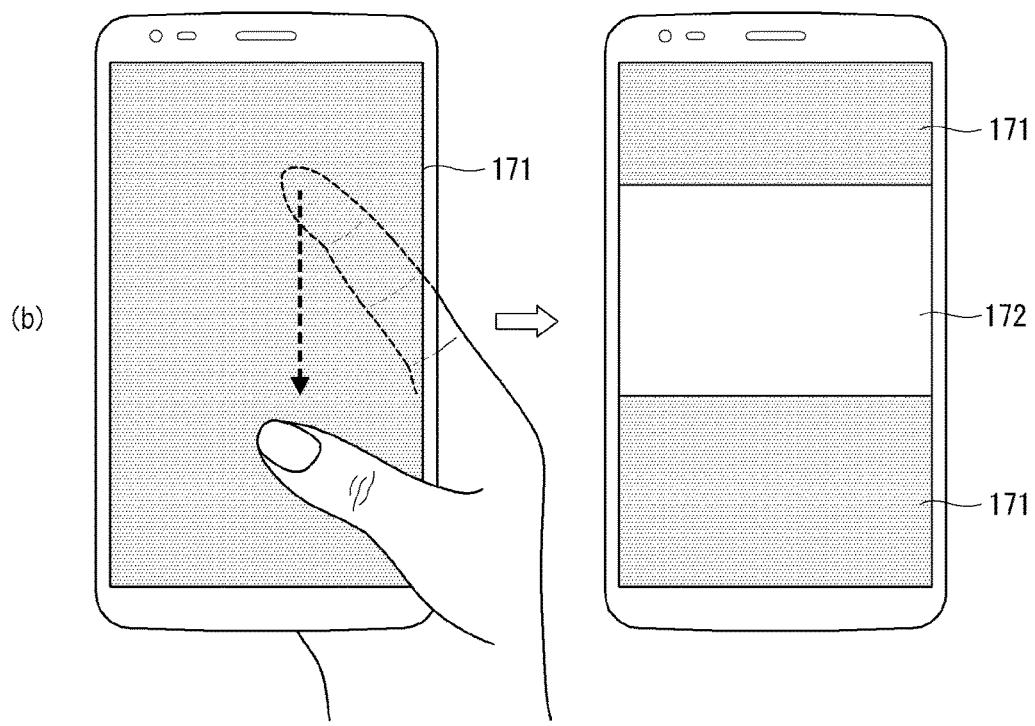

FIG. 18
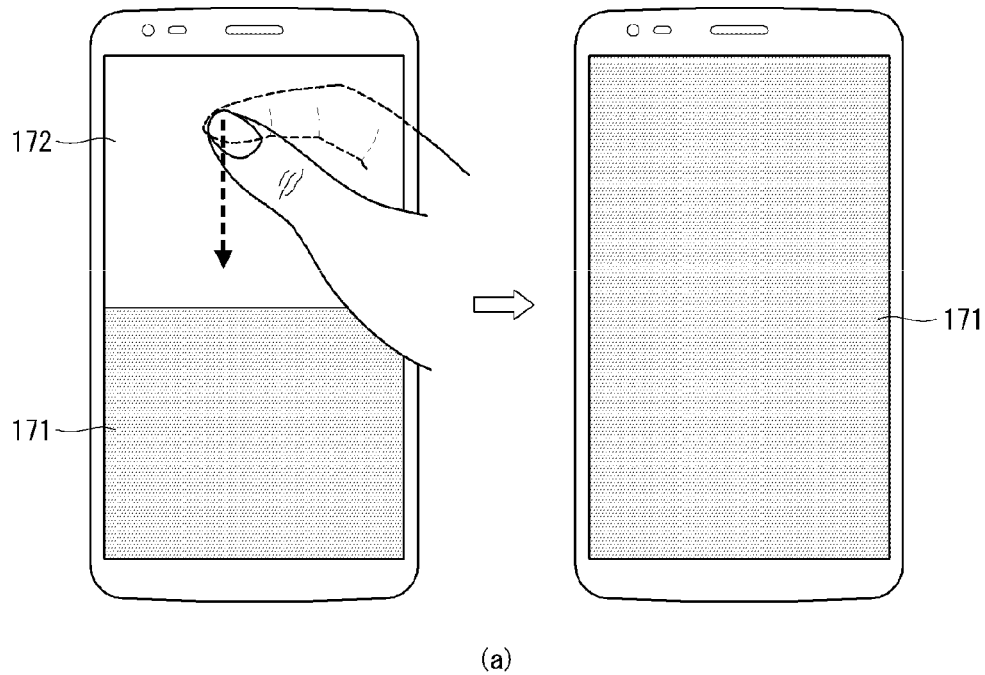
(a)
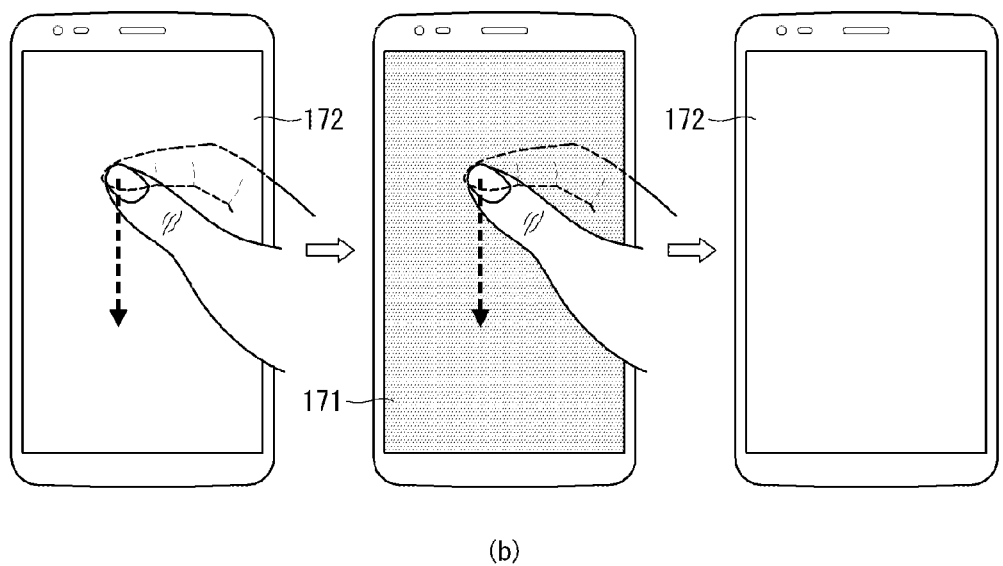
(b)

(a)          (b)

FIG. 31
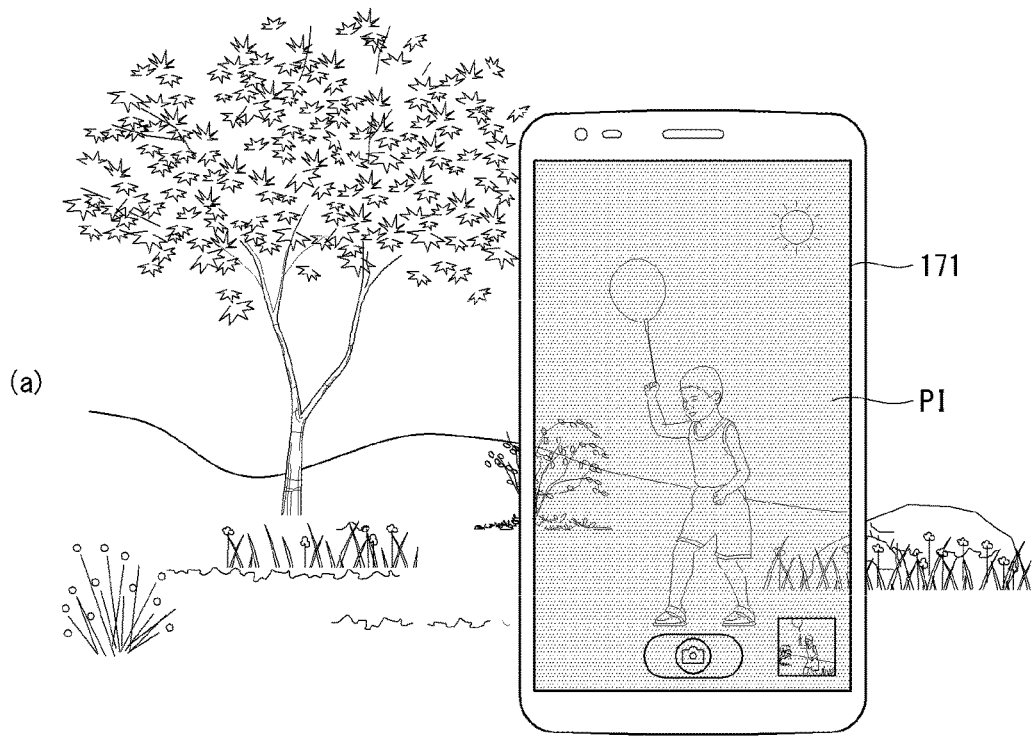
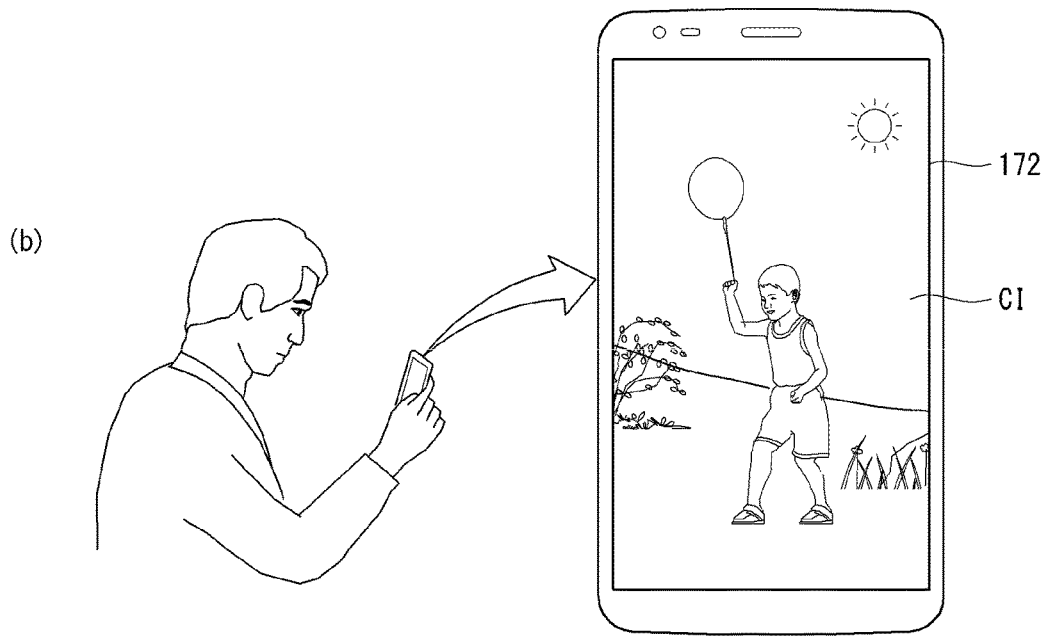

MOBILE TERMINAL AND METHOD FOR CONTROLLING THE SAME

CROSS-REFERENCE TO RELATED APPLICATIONS

This application claims priority to Korean Patent Application No. 10-2015-0160165 filed on 16 Nov. 2015 in Korea, the entire contents of which is hereby incorporated by reference in its entirety.

BACKGROUND OF THE DISCLOSURE

1. Field of the Disclosure

The present disclosure relates to a mobile terminal including a transparent display and a method for controlling the same.

2. Background of the Disclosure

With the evolution of display technology, future displays such as an electronic device including a transparent display are under discussion.

A transparent display is transparent and thus a background behind the display is visible through the display. While conventional display panels were manufactured using opaque semiconductors such as Si and GaAs, development of new electronic devices is accelerated for various application fields that cannot be covered by the conventional display panels.

A device having a transparent display is transparent by being implemented in a form including a transparent oxide semiconductor layer. When a user uses a device having a transparent display, the user can see necessary information through the screen of the transparent display while viewing an object behind the device through the transparent display. Accordingly, transparent displays can enlarge availability beyond spatial and temporal restrictions of conventional displays.

As devices having a transparent display can be used for various purposes in various environments, development of a user interface for enabling the transparent display to be used more effectively is needed.

SUMMARY OF THE DISCLOSURE

Accordingly, an object of the present disclosure is to address the above and other problems.

An object of the present disclosure is to provide a mobile terminal that provides a user interface through which a user can control the mobile terminal more efficiently using characteristics of a transparent display, and a method for controlling the mobile terminal.

Another object of the present disclosure is to provide a mobile terminal capable of controlling the transparency of at last part of a transparent display through user touch interaction on the transparent display, and a method for controlling the mobile terminal.

Yet another object of the present disclosure is to provide a mobile terminal capable of automatically controlling the transparency of a transparent display according to the type of information displayed on the transparent display, and a method for controlling the mobile terminal.

Still another object of the present disclosure is to provide a mobile terminal capable of protecting personal information to enhance security and improving visibility by controlling the transparency of a transparent display according to the type of information displayed on the transparent display.

Technical tasks obtainable from the present disclosure are not limited to the above-mentioned technical task. In addition, other unmentioned technical tasks can be clearly understood from the following description by those having ordinary skill in the technical field to which the present disclosure pertains.

A mobile terminal, according to one aspect of the present invention, includes: a transparent display; a shielding film provided to at least part of the rear side of the display and including a plurality of areas having independently controllable transparencies; and a controller configured to sense touch input applied to the display and to change transparency of an area corresponding to the touch input, from among the plurality of areas of the shielding film, into one of a transparent state and an opaque state to control transparency of the display.

The controller may be configured to display a grid indicating the plurality of areas of the shielding film on the display when the display is in the transparent state and to change an area corresponding to the touch input, from among the plurality of areas defined by the grid, into the opaque state.

The plurality of areas may be provided by equally dividing the shielding film into n areas (n being a natural number equal to or greater than 2), wherein the grid is provided to the display to be mapped to the n divided areas.

Mapping arrangement of the grid may be changed and displayed according to content provided to the display when the display is in a transparent state.

The touch input may include a drag input, wherein the drag input includes at least one of a first drag input sensed through the front side of the display, a second drag input sensed through the rear side of the display and a third drag input simultaneously sensed through the front side and the rear side of the display.

The controller may be configured to maintain the transparent state of the display when the length of drag input starting from a first area of the display in the transparent state, corresponding to the plurality of areas, is less than a predetermined threshold length and to change the first area and a second area into an opaque state when the length of the drag input starting from the first area exceeds the threshold length to be extended to the second area.

The controller may be configured to change the entire area of the display into one of the transparent state and an opaque state irrespective of an area covered by the third drag input when the third drag input is sensed.

The controller may be configured to display a shielding layer on the display such that the shielding layer slides in a first direction when the touch input is extended in the first direction and, when the extended touch input is released, to change a region of the shielding film, interacting with the touch input, into an opaque state and to remove the shielding layer.

The controller may be configured to control transparency of an opaque area according to specific directivity upon sensing a touch pattern having the specific directivity when at least part of the display has been changed to an opaque area.

The controller may be configured to automatically change at least part of the display for displaying a predetermined screen into an opaque state when the display displays the predetermined screen in a transparent state.

The predetermined screen may include a notification layer including state information of the mobile terminal.

The predetermined screen may include an execution screen of a specific application.

The predetermined screen may include a screen for performing an event generated according to communication with an external device.

The predetermined screen may include a screen for inputting security information.

The mobile terminal may further include an illumination sensor configured to sense external brightness, wherein the controller is configured to control the transparency of the display on the basis of a sensing signal from the illumination sensor.

The controller may be configured to display information in a reversed state when the information is displayed in a transparent area of the display.

A method of controlling a mobile terminal including a transparent display, according to another aspect of the present invention, includes: sensing touch input applied to the display; sensing an area interacting with the touch input, from among a plurality of areas of a shielding film provided to the rear side of the display; and changing transparency of the area of the shielding film, interacting with the touch input, into one of a transparent state and an opaque state to control transparency of the display, wherein the shielding film is provided to at least part of the rear side of the display and includes the plurality of areas having independently controllable transparencies.

The mobile terminal and the method for controlling the same according to the present disclosure have the following advantages.

According to the present disclosure, it is possible to provide a user interface through which a user can control the mobile terminal more efficiently using characteristics of a transparent display.

In addition, according to the present disclosure, it is possible to control the transparency of at least part of the transparent display through user touch interaction on the transparent display and to control a transparent state of a desired region of the display through simple touch interaction.

Furthermore, according to the present disclosure, it is possible to automatically control the transparency of the transparent display according to the type of information displayed on the transparent display.

Moreover, according to the present disclosure, it is possible to protect personal information to enhance security and to improve visibility by controlling the transparency of the transparent display according to type of information displayed on the transparent display.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings, which are given by illustration only, and thus are not limitative of the present disclosure, and wherein:

FIG. 1 is a block diagram of a mobile terminal in accordance with the present disclosure;

FIGS. 3 to 11 are diagrams for explaining a configuration of a shielding film for controlling the transparency of a transparent display according to an embodiment of the present disclosure;

FIGS. 14 to 16 are diagrams for explaining an example of controlling the transparency of at least part of a display through user touch interaction;

FIGS. 17 to 19 are diagrams for explaining an example of controlling the transparency of at least part of the display according to a touch interaction pattern of a user;

FIGS. 23 to 32 are diagrams for explaining operations of the mobile terminal according to the second embodiment of the present disclosure;

DETAILED DESCRIPTION OF THE PREFERRED EMBODIMENTS

Figure 2A:
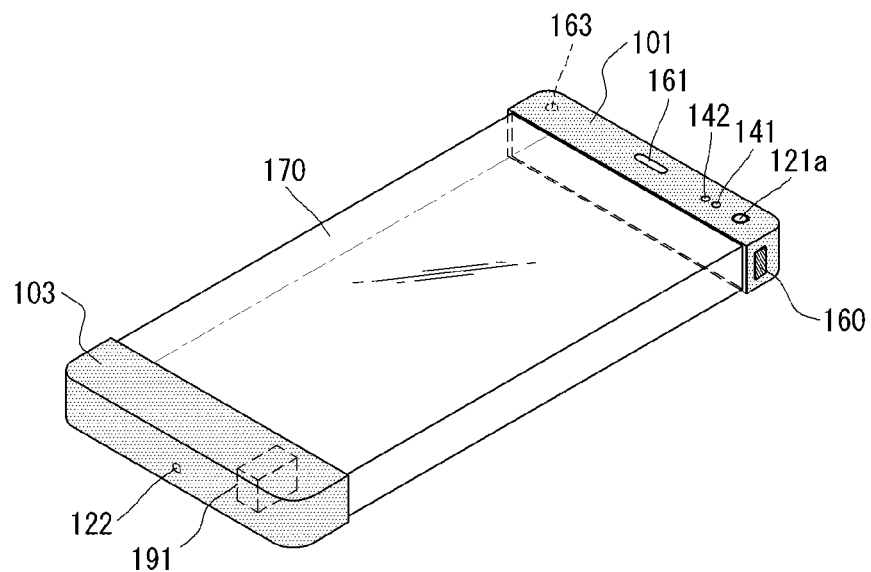
FIGS. 2A to 2D are conceptual diagrams of an example of the mobile terminal in accordance with the present disclosure, viewed from different directions.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure and FIGS. 2A to 2D are conceptual diagrams of an example of the mobile terminal in accordance with the present disclosure, viewed from different directions.

FIG. 1 is a block diagram of a mobile terminal in accordance with the present disclosure.

The mobile terminal 100 is shown having components such as a wireless communication unit 110, an input unit 120, a sensing unit 140, an output unit 10, an interface unit 160, a memory 165, a controller 180, and a power supply unit 190. It is understood that implementing all of the illustrated components is not a requirement, and that greater or fewer components may alternatively be implemented.

Referring now to FIG. 1, the mobile terminal 100 is shown having wireless communication unit 110 configured with several commonly implemented components.

For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 10 is typically configured to output various types of information, such as audio, video, tactile output, and the like. The output unit 10 is shown having a display unit 170, an audio output module 161, a haptic module 162, and an optical output module 163.

The display unit 170 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 165 is typically implemented to store data to support various functions or features of the mobile terminal 100. For instance, the memory 165 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 165, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1, or activating application programs stored in the memory 165. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO(Enhanced Voice-Data Optimized or Enhanced Voice-Data Only), Wideband CDMA (WCDMA), High Speed Downlink Packet access (HSDPA), HSUPA(High Speed Uplink Packet Access), Long Term Evolution (LTE), LTE-A(Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check to the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 170 or stored in memory 165. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 170, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 170, or convert capacitance occurring at a specific part of the display unit 170, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 170 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 170 is generally configured to output information processed in the mobile terminal 100. For example, the display unit 170 may display execution screen information of an application program executing at the mobile terminal 100 or user interface (UI) and graphic user interface (GUI) information in response to the execution screen information.

In some embodiments, the display unit 170 may be implemented as a stereoscopic to display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 161 is generally configured to output audio data. Such audio data may be obtained from any of a number of different sources, such that the audio data may be received from the wireless communication unit 110 or may have been stored in the memory 165. The audio data may be output during modes such as a signal reception mode, a call mode, a record mode, a voice recognition mode, a broadcast reception mode, and the like. The audio output module 161 can provide audible output related to a particular function (e.g., a call signal reception sound, a message reception sound, etc.) performed by the mobile terminal 100. The audio output module 161 may also be implemented as a receiver, a speaker, a buzzer, or the like.

A haptic module 162 can be configured to generate various tactile effects that a user feels, perceive, or otherwise experience. A typical example of a tactile effect generated by the haptic module 162 is vibration. The strength, pattern and the like of the vibration generated by the haptic module 162 can be controlled by user selection or setting by the controller. For example, the haptic module 162 may output different vibrations in a combining manner or a sequential manner.

Besides vibration, the haptic module 162 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 162 can also be implemented to allow the user to feel a tactile effect through a muscle sensation such as the user's fingers or arm, as well as transferring the tactile effect through direct contact. Two or more haptic modules 162 may be provided according to the particular configuration of the mobile terminal 100.

An optical output module 163 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 163 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 165 can store programs to support operations of the controller 180 and store input/output data (for example, phonebook, messages, still images, videos, etc.). The memory 165 may store data related to various patterns of vibrations and audio which are output in response to touch inputs on the touch screen.

The memory 165 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 165 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Figure 2B:
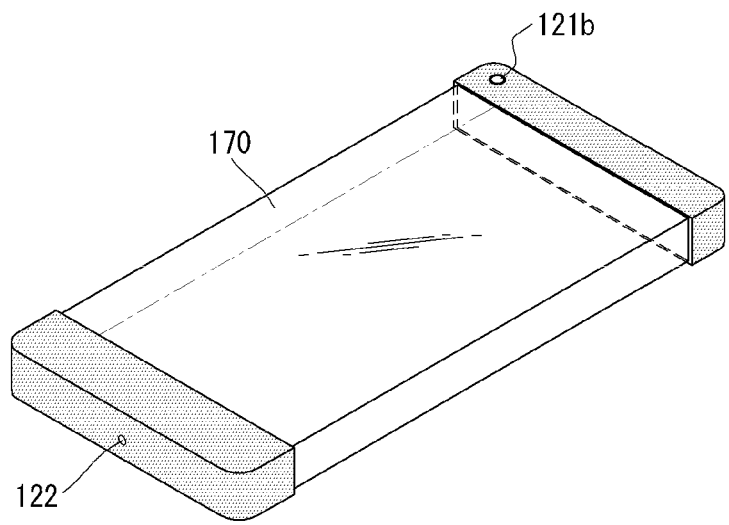
Figure 2C:
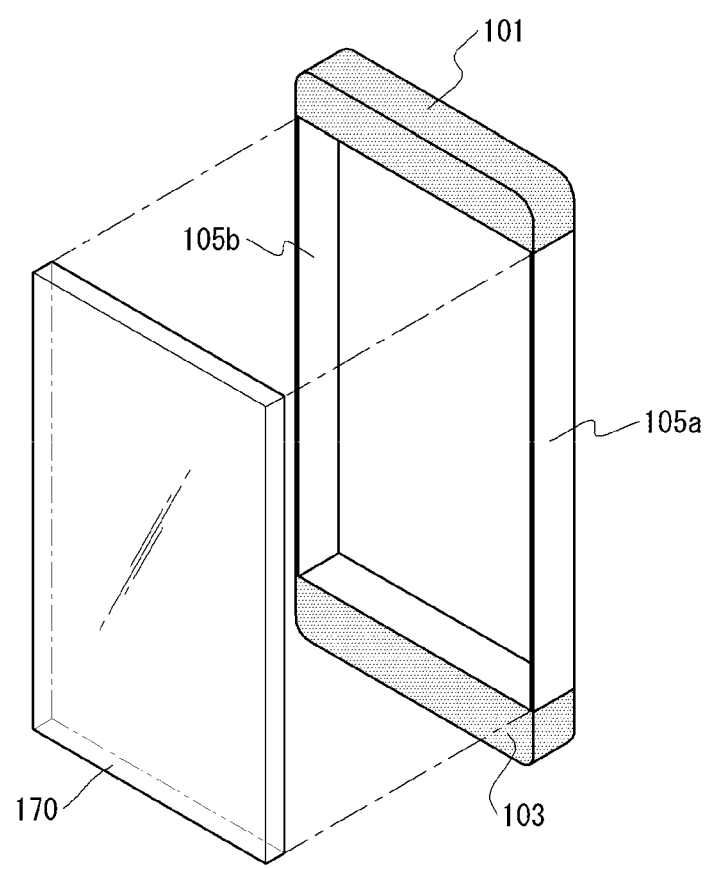

Various embodiments described herein may be implemented in a computer-readable medium, a machine-readable medium, or similar medium using, for example, software, hardware, or any combination thereof Referring to FIGS. 2A to 2C, the mobile terminal 100 has a bar-shaped terminal body. However, the present disclosure is not limited thereto and may be applied to various structures such as watch type, clip type and glass type or folder type, flip type, slide type, swing type and swivel type in which two or more bodies are relatively movably coupled. Description of a specific type of the mobile terminal is applicable to mobile terminals of other types although the present disclosure will be described with respect to the specific type.

Here, the mobile terminal 100 is regarded as at least one assembly and the terminal body may be understood as referring to the assembly.

The mobile terminal 100 according to an embodiment of the present disclosure may include a transparent display 170 having controllable transparency, and a first housing 101 and a second housing 103 which respectively hold the upper and lower ends of the transparent display 170. Here, if the display unit 170 of FIG. 1 has a transparent attribute, the display unit 170 can be defined the transparent display 170.

The transparent display 170 may not include a rear case such that the rear of the transparent display 170 is visible therethrough. Accordingly, the display 170 may form the exterior of the mobile terminal 100.

The display 170 displays (outputs) information processed in the mobile terminal 100. For example, the display 170 may display execution screen information of application programs executed in the mobile terminal 100 and a user interface (UI) and a graphical user interface (GUI) according to the execution screen information.

The transparent display 170 may include at least one of a liquid crystal display (LCD), a thin film transistor-liquid crystal display (TFT-LCD), an organic light-emitting diode (OLED), a flexible display, a 3D display and an e-ink display.

A typical example of the transparent display 170 is a transparent OLED (TOLED). The rear structure of the display 170 may be configured in a transmissive structure. According to this structure, the user can see an object located behind the terminal body through an area occupied by the transparent display 170.

In addition, the mobile terminal 100 may include two or more transparent displays 170 according to implementation form thereof. In this case, a plurality of displays may be arranged in a separate or integrated manner on one face of the mobile terminal 100 or respectively arranged on different faces of the mobile terminal 100.

The transparent display 170 may include a touch sensor for sensing touch such that a control command is input to the transparent display 170 according to touch. When a touch is applied to the display 170, the touch sensor senses the touch and the controller 180 generates a control command corresponding to the touch on the basis of the sensing result. Input applied to the display 170 according to touch may include characters, numerals, and menu items that may be indicated or designated in various modes.

The touch sensor may be configured in the form of a film including a touch panel and arranged between a window and the display 170 on the rear side of the window or may be a metal wire directly patterned on the rear side of the window. Alternatively, the touch sensor may be integrated with the panel of the transparent display. For example, the touch sensor may be arranged on the board of the display or provided inside of the display.

In this manner, the transparent display 170 may form a touch screen with the touch sensor. In this case, the touch screen may serve as the user input unit 123 (refer to FIG. 1). The touch screen may replace at least part of functions of operating units.

Various electronic components may be provided to internal spaces of the first housing 101 and the second housing 103. The housings may be formed through injection molding using synthetic resins or may be formed of a metal, for example, stainless steel (STS), aluminum (Al), titanium (Ti) or the like.

The first housing 101 may include a second camera 121*a*, a proximity sensor 141, an illumination sensor 142, an audio output unit 161, an optical output unit 163 and an interface 160. The second housing 103 may include the microphone 122 and the power supply unit 190. While the power supply 191 is shown in FIG. 2A as an electronic component that may be included in the second housing 103, various electronic components may be mounted in the second housing 103. In addition, the aforementioned components are not limited to the aforementioned arrangement and may be excluded or replaced, or provided to other sides as necessary. Furthermore, necessary elements other than the aforementioned elements may be added to the first housing and the second housing and arranged at appropriate positions therein.

The second camera 121*a* processes video frames of a still image or video obtained through an image sensor in a photographing mode or video phone mode. The processed video frames may be displayed on the transparent display 151 and stored in the memory 165.

The interface 160 serves as a path through which the mobile terminal 100 is connected to an external device. For example, the interface 160 may be at least one of a connection terminal for connection with other devices (e.g., an earphone and a removable speaker), a port for short-range communication (e.g., IrDA port, Bluetooth port, wireless LAN port or the like) and a power supply terminal for supplying power to the mobile terminal 100. The interface 160 may be implemented in the form of a socket accommodating removable cards such as a subscriber identification module (SIM), a user identity module (UIM) and a memory card for storing information.

Referring to FIG. 2B, a first camera 121b may be provided to the rear side of the first housing 101. In this case, the first camera 121b has a photographing direction opposite that of the second camera 121a. The second camera 121a may be low resolution such that a user face can be captured and transmitted during video telephony, whereas the first camera 121b may be high resolution since the first camera 121b photographs a subject and does not immediately transmit the photographed result in many cases. The first camera 121b may include a plurality of lenses arranged along at least one line. The plurality of lenses may be arranged in a matrix. Such camera may be called an "array camera". When the first camera 121b is configured as an array camera, the first camera 121b may photograph images in various manners using the plurality of lenses and obtain images with higher quality. A flash (not shown) may be arranged in proximity to the first camera 121b. The flash flashes a light upon an object when the first camera 121a photographs the object.

The second housing 103 includes the power supply unit 190 (refer to FIG. 1). The power supply unit 190 may include a battery 191 which is embedded in the terminal body or detachably inserted into the terminal body.

The microphone 122 is configured to receive user voice and other sounds. The microphone 122 may be provided to a plurality of portions of the mobile terminal to receive stereo sound.

One of the first housing 101 and the second housing 103 may include at least one antenna (not shown) for wireless communication. The antenna may be embedded in the housing. For example, an antenna, a part of the broadcast receiving module 111 (refer to FIG. 1), may be configured to be retractable from the housing. Alternatively, the antenna may be configured in the form of a film and attached to the inner side of the second housing 103.

When the first housing 101 and the second housing 103 are integrated with side frames 105a and 105b, as shown in FIG. 2C, the side frames 105a and 105b including a conductive material may be configured to serve as an antenna.

The structure of the mobile terminal 100, in which the first housing 101 and the second housing 103 hold the display 170, has been described with reference to FIGS. 2A to 2C. In the structure shown in FIGS. 2A and 2B, while the upper end of the display 170 is supported by the first housing 101 and the lower end thereof is supported by the second housing 103, there is no support for holding both sides of the transparent display 170.

However, the present disclosure is not limited thereto. For example, in the structure supporting the display 170, shown in FIG. 2C, the first housing 101 and the second housing 103 may be connected through the side frames 105a and 105b to form a structure. The structure serves as a side frame and the display 170 is inserted into the side frame to form the exterior of the mobile terminal 100.

The side frames 105a and 105b shown in FIG. 2C may include various operating units (not shown). The operating units may include a unit that receives commands such as "menu", "home key", "cancel" and "search". The operating units may receive inputs such as a command for controlling the volume of sound output through the audio output unit and a command for switching between a touch recognition mode and an image capture mode of the display 170.

Differently from the exteriors shown in FIGS. 2A to 2C, the display 170 may be supported by only one of the first housing 101 and the second housing 103.

Furthermore, the first housing 101 and the second housing 103 shown in FIGS. 2A and 2B may be configured to be detachably combined with the display 170. Accordingly, the use of the mobile terminal 100 may be simplified such that only desired functions are executed through the transparent display 170 according to electronic components included in the first housing 101 or the second housing 103.

For example, since the second camera 121a is provided to the front side of the first housing 101 and the first camera 121b is provided to the rear side of the first housing 101 in the structure shown in FIG. 2A, the mobile terminal 100 may be used with the transparent display 170 supported only by the first housing 101 by detaching the second housing 103 from the transparent display 170 when the user wants to photograph only images through the transparent display 170. When mobile communication modules are included in the second housing 103 and video telephony and voice call are mainly used, the mobile terminal 100 may be used in a state that the first housing 101 is detached from the display 170.

Figure 2D:
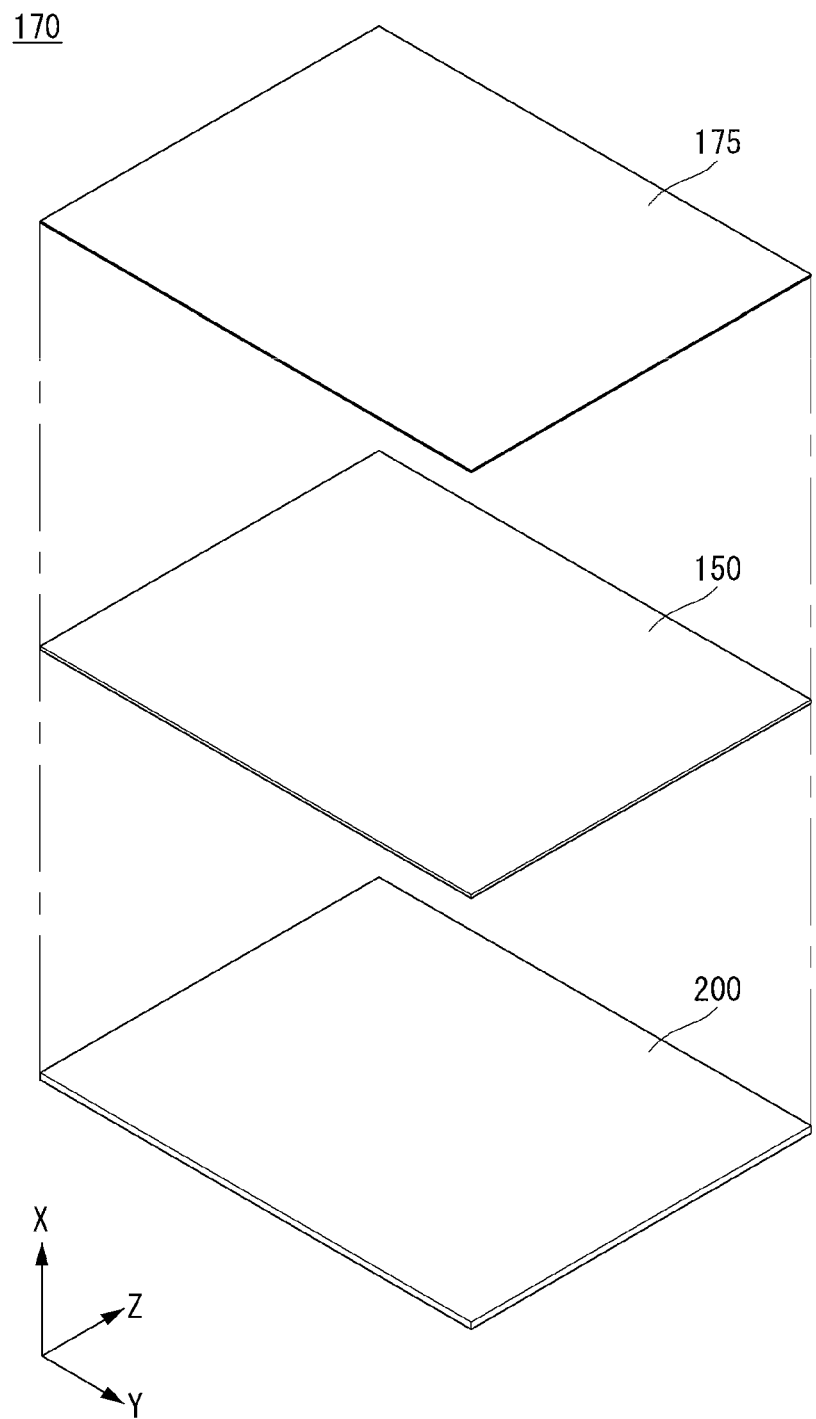

As shown in FIG. 2D, the transparent display 170 of the mobile terminal 100 according to the embodiment of the invention may include a display panel 175, a back cover 200 and a shielding film 150.

The display panel 175 may be an area displaying an image. The display panel 175 may be a display panel not requiring a backlight unit due to its self-emission structure, for example OLED structure.

At least a portion of the display panel 175 may be substantially transparent if not totally transparent. Thus, when other configuration of the transparent display 170 is transparent, the transparent display 170 may be configured to be entirely substantially transparent if not entirely transparent.

The back cover 200 may be configured to provide rigidity to the display panel 175. The back cover 200 may be positioned on a back surface of the display panel 175 which is configured as a thin film. The display panel 175, etc., may be attached to the back cover 200. When the components of the transparent display 170 are attached to the back cover 200, the display panel 170, etc., may maintain a designed shape such as a slim shape.

At least a portion of the back cover 200 may be made of a transparent or translucent material. For example, the back cover 200 may be made of glass material.

The shielding film 150 may be positioned between the display panel 175 and the back cover 200. The shielding film 150 may substantially have the same size as the display panel 170. For example, the total area of the shielding film 150 may be substantially or the same as the total area of the display panel 175. The size of the shielding film 150 may be substantially or the same as the size of an effective display area of the display panel 175.

The transparency of the shielding film 150 may vary depending on the control signal. Namely, the shielding film 150 may be changed from a transparent state to an opaque state, and vice versa. When the shielding film 150 is changed to the opaque state, it may be difficult for an observer at one side (or the other side) of the display 10 to observe an object at the other side (or one side) of the transparent display 170.

The shielding film 150 may be changed to the transparent state when the control signal is inputted, or may be changed to the transparent state when there is no control signal input. For example, the shielding film 150 may be changed to the transparent state when the transparent display 170 is turned off, or may be changed to the opaque state when the control signal is turned off.

As shown in FIG. 3, the shielding film 150 may include a first film 151, a first conductive layer 153 positioned at a back surface of the first film 151, a discoloration layer 155 positioned at a back surface of the first conductive layer 153, a second conductive layer 157 positioned at a back surface of the discoloration layer 155, and a second film 159 positioned at a back surface of the second conductive layer 157.

The first and second films 151 and 159 may form an external surface of the shielding film 150. Namely, the first and second films 151 and 159 may form both sides of the shielding film 150. The first and second films 151 and 159 may be formed of a transparent material. For example the first and second films 151 and 159 may be formed of polyethylene terephthalate (PET).

The first and second conductive layers 153 and 157 may be positioned inside the first and second films 151 and 159, respectively. The first and second conductive layers 153 and 157 may be respectively connected to first and second electrodes 152 and 156, respectively.

One of the first and second electrodes 152 and 156 may be a driving electrode, and the other may be a common electrode. For example, the second electrode 156 may be the driving electrode, and the first electrode 152 may be the common electrode. In this instance, the second conductive layer 157 connected to the second electrode 156 may serve as the driving electrode, and the first conductive layer 153 connected to the first electrode 152 may serve as the common electrode. A predetermined electric current may be supplied to the first electrode 152 serving as the common electrode.

The transparency of the discoloration layer 155 may vary depending on the control signal through the first and second conductive layers 153 and 157. For example, the discoloration layer 155 may include a liquid crystal element. The transparency of the discoloration layer 155 including the liquid crystal element may vary depending on the control signal applied to at least one of the first and second conductive layers 153 and 157. Namely, the discoloration layer 155 may be transparently or opaquely seen due to liquid crystals rearrangement in response to the control signal.

The transparency of the discoloration layer 155 may vary depending on the control signal. For example, the transparency of the discoloration layer 155 may vary depending on an amount of applied electric current and/or a magnitude of applied voltage. In this instance, the discoloration layer 155 may be sequentially changed from the transparent state to the opaque state via a translucent state. In other words, the transparency of the discoloration layer 155 may be sequentially changed.

Figure 4:
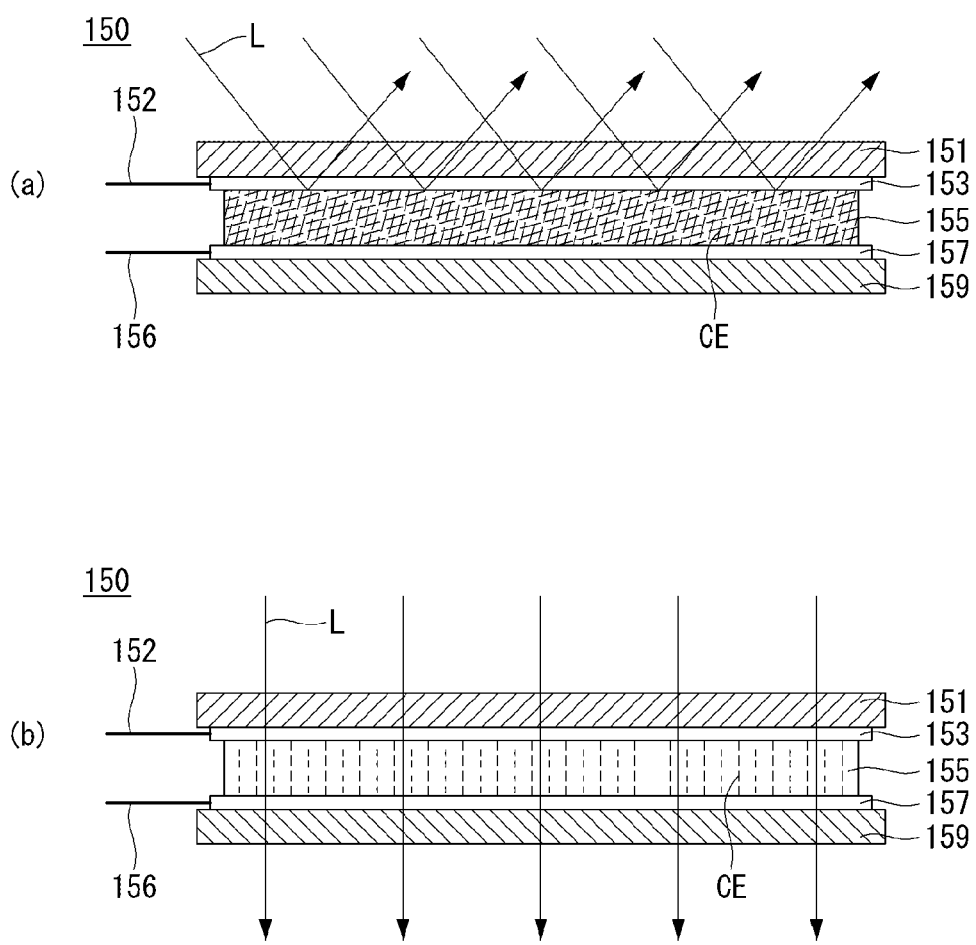

As shown in (a) of FIG. 4, when a predetermined signal is inputted to the first and second conductive layers 153 and 157 through the first and second electrodes 152 and 156, respectively, liquid crystal particles CE inside the discoloration layer 155 may be non-uniformly distributed. The non-uniformly distributed liquid crystal particles CE of the discoloration layer 155 may block the discoloration layer 155 from transmitting light L. When the non-uniformly distributed liquid crystal particles CE block the discoloration layer 155 from transmitting the light L, the discoloration layer 155 may be opaquely seen.

As shown in (b) of FIG. 4, liquid crystal particles CE inside the discoloration layer 155 may be uniformly distributed in one direction. Namely, the liquid crystal particles CE may be uniformly distributed so that the discoloration layer 155 can transmit light L. As the discoloration layer 155 transmits the light L, the discoloration layer 155 may be transparently seen.

Figure 5:
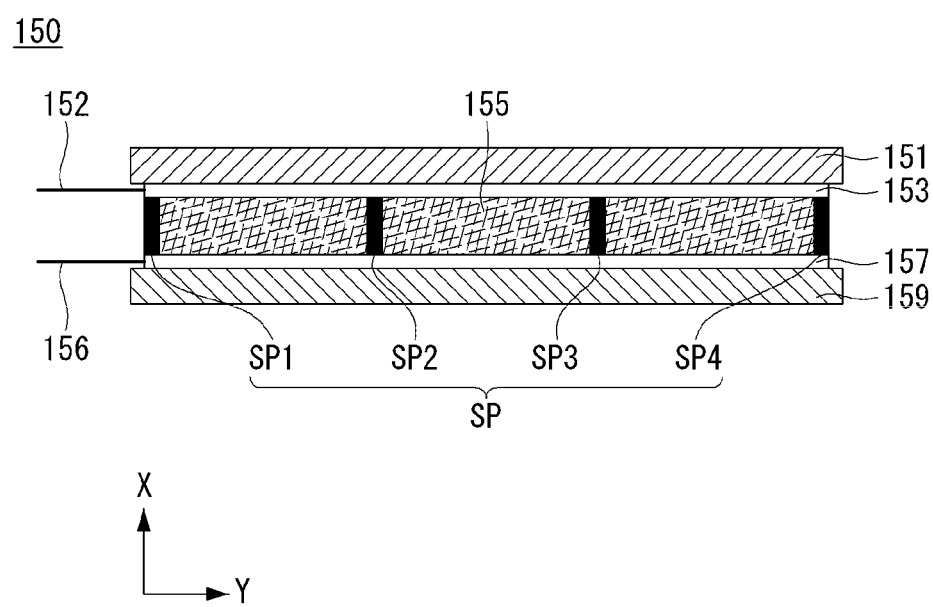

As shown in FIG. 5, the discoloration layer 155 may include a plurality of structures SP. The structures SP may include shielding layers SP1 and SP4 and spacers SP2 and SP3.

The shielding layers SP1 and SP4 may be positioned outside the discoloration layer 155. The shielding layers SP1 and SP4 may be positioned on both sides of the discoloration layer 155. The shielding layers SP1 and SP4 may prevent the liquid crystal particles CE from being discharged to the outside of the discoloration layer 155.

The spacers SP2 and SP3 may be positioned inside the discoloration layer 155. The spacers SP2 and SP3 positioned inside the discoloration layer 155 may keep a height of the discoloration layer 155 constant. The plurality of spacers SP2 and SP3 may be separated from one another.

Figure 6:
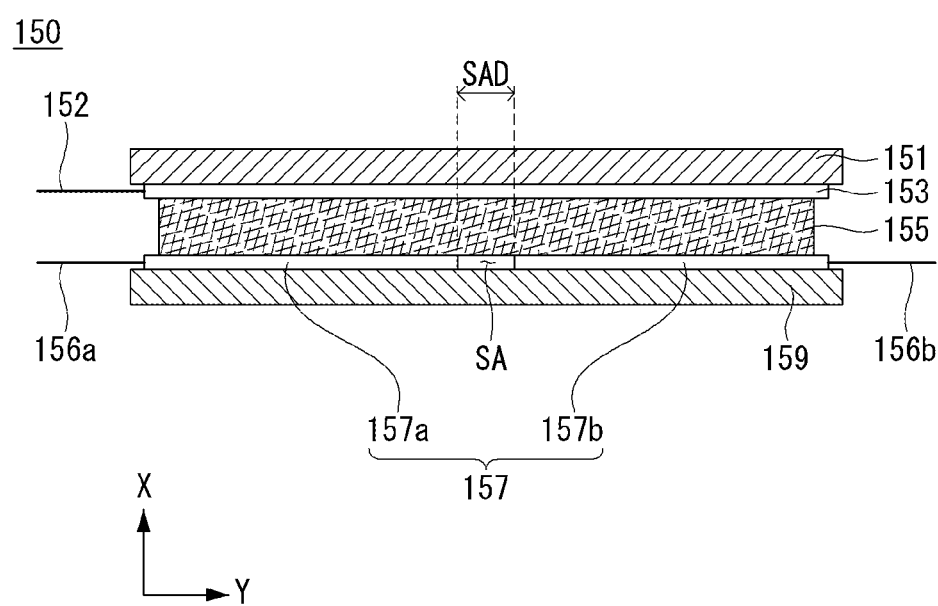

As shown in FIG. 6, the second conductive layer 157 may be divided into a plurality of areas. For example, a conductive layer 157a and a conductive layer 157b may be separated from each other by a partition portion SA. The conductive layer 157a may be connected to an electrode 156a, and the conductive layer 157b may be connected to an electrode 156b. Namely, the conductive layers 157a and 157b may be electrically independent from each other.

The partition portion SA may have non-conductive characteristics. For example, the partition portion SA may have the non-conductive characteristics by partially removing the conductive layers 157a and 157b formed of a conductive material or by filling a removed area of the conductive layers 157a and 157b with a non-conductive material.

Figure 8:
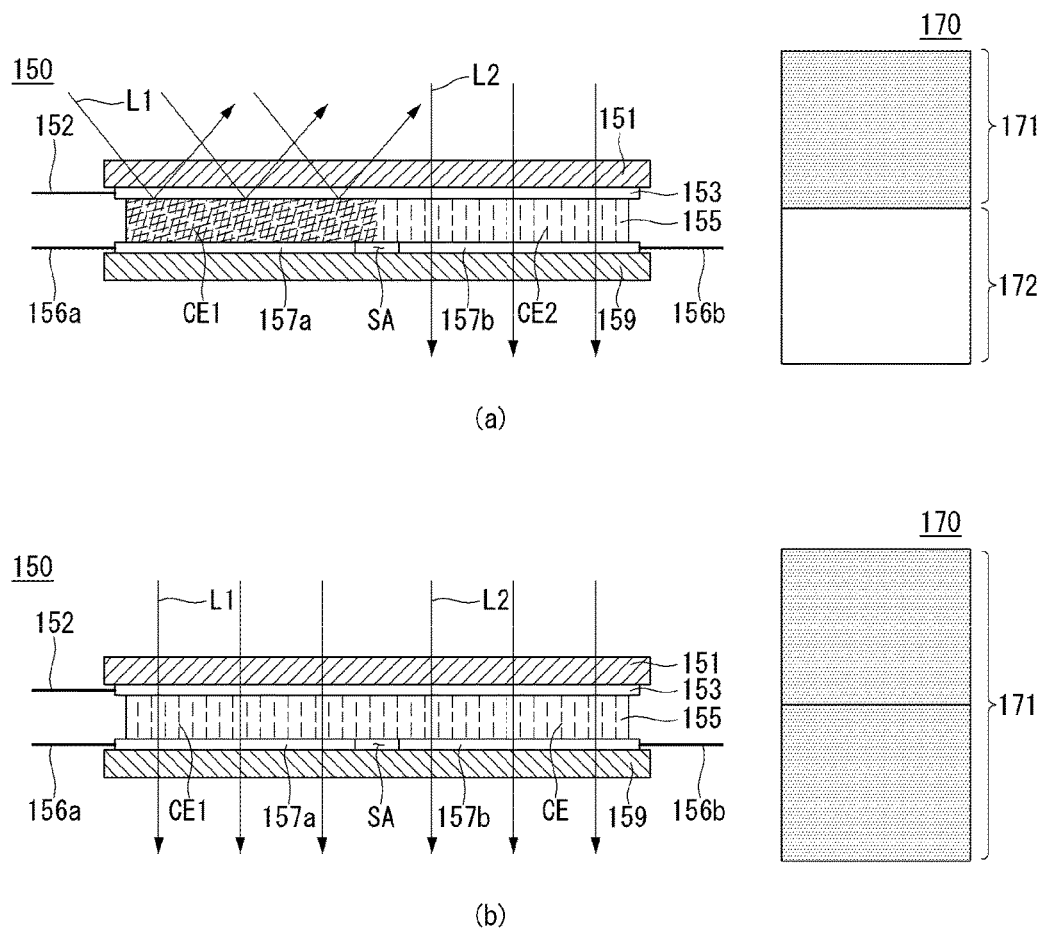

As shown in FIGS. 7 and 8, a transparent or opaque area may be formed using the second conductive layer 157 including a plurality of areas through various methods.

As shown in (a) of FIG. 7, the control signal may be applied to the conductive layers 157a and 157b through the electrodes 156a and 156b. For example, the control signal of a predetermined voltage may be inputted. When the control signal is inputted through the conductive layers 157a and 157b serving as the driving electrode, light L may be blocked from being transmitted by the discoloration layer 155 due to the non-uniform distribution of the liquid crystals CE. Thus, the entire portion of the discoloration layer 155 may be opaque.

As shown in (b) of FIG. 7, different control signals may be applied to the conductive layer 157a and the conductive layer 157b. For example, a control signal of a voltage "A" may be applied to the conductive layer 157a, and a control signal of a voltage "B" may be applied to the conductive layer 157b. The control signal of the voltage "A" may align first liquid crystals CE1 corresponding to the conductive layer 157a, and the control signal of the voltage "B" may distribute second liquid crystals CE2 corresponding to the conductive layer 157b. Thus, first light L1 of an area corresponding to the conductive layer 157a may be transmitted by the discoloration layer 155, and second light L2 of an area corresponding to the conductive layer 157b may not be transmitted by the discoloration layer 155. Namely, the area corresponding to the conductive layer 157a may be transparent, and the area corresponding to the conductive layer 157b may be opaque.

As shown in (a) of FIG. 8, different control signals may be applied to the conductive layer 157a and the conductive layer 157b. For example, a control signal of a voltage "B" may be applied to the conductive layer 157a, and a control signal of a voltage "A" may be applied to the conductive layer 157b. In this instance, unlike (b) of FIG. 7, first light L1 of an area corresponding to the conductive layer 157a may not be transmitted by the discoloration layer 155, and second light L2 of an area corresponding to the conductive layer 157b may be transmitted by the discoloration layer 155.

As shown in (b) of FIG. 8, when the same voltage is applied to the conductive layers 157a and 157b, the entire portion of the discoloration layer 155 may transmit light. Namely, the discoloration layer 155 may be transparent.

As shown in (a) of FIG. 9, the second conductive layer 157 may be divided into a plurality of parts. For example, the second conductive layer 157 may be divided into a conductive layer 157a and a conductive layer 157b. In this instance, a first area corresponding to the conductive layer 157a and a second area corresponding to the conductive layer 157b may operate independently.

As shown in (b) of FIG. 9, the second conductive layer 157 may be divided into a conductive layer 157a and a conductive layer 157b. The first conductive layer 153 may be divided into a conductive layer 153a and a conductive layer 153b. A formation direction of a first partition portion SA1 for dividing the first conductive layer 153 into the conductive layers 153a and 153b may be different from a formation direction of a second partition portion SA2 for dividing the second conductive layer 157 into the conductive layers 157a and 157b. For example, the first partition portion SA1 may be formed in a horizontal direction (Y-direction), and the second partition portion SA2 may be formed in an orthogonal direction (Z-direction). Thus, the conductive layers 153a and 153b and the conductive layers 157a and 157b may overlap each other to form four division areas.

Figure 10:
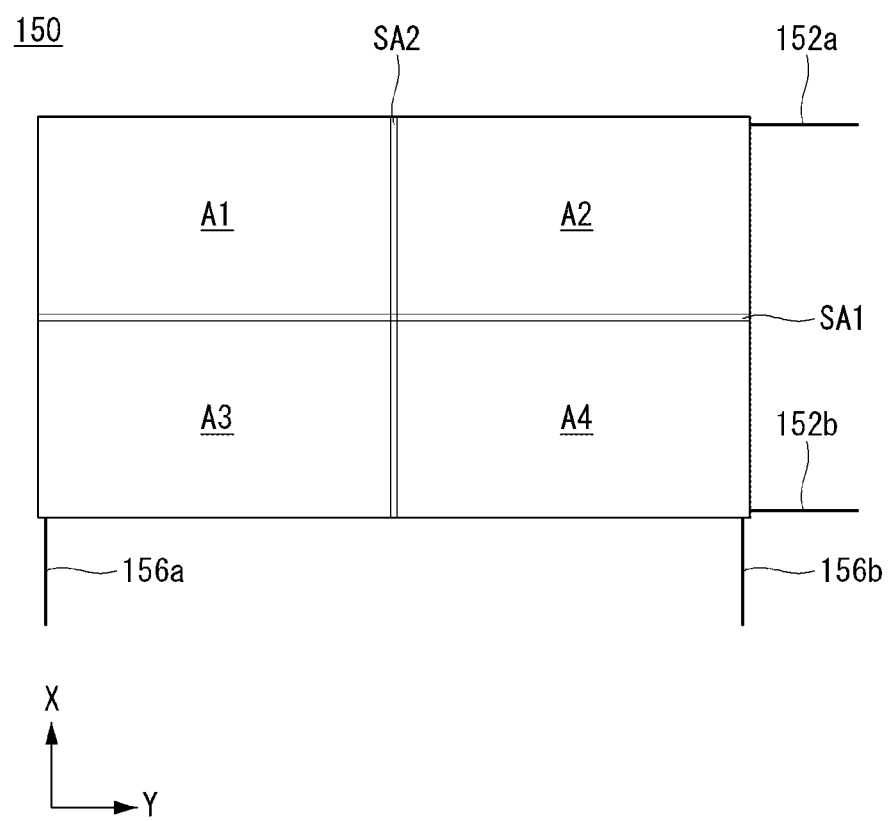

As shown in FIG. 10, first to fourth areas A1 to A4 may be formed by the first and second partition portions SA1 and SA2 formed in the different directions. The first to fourth areas A1 to A4 may operate independently. For example, the first area A1 formed by an overlap of the conductive layer 153a and the conductive layer 157a may operate independently from the second to fourth areas A2 to A4. Namely, when the control signal is applied to the conductive layer 153a and the conductive layer 157a, only the first area A1 may change from a transparent state to an opaque state or from the opaque state to the transparent state. Thus, each of the first and second conductive layers 153 and 157 may obtain an effect of four divisions without dividing each of the first and second conductive layers 153 and 157 into four parts.

Figure 11:
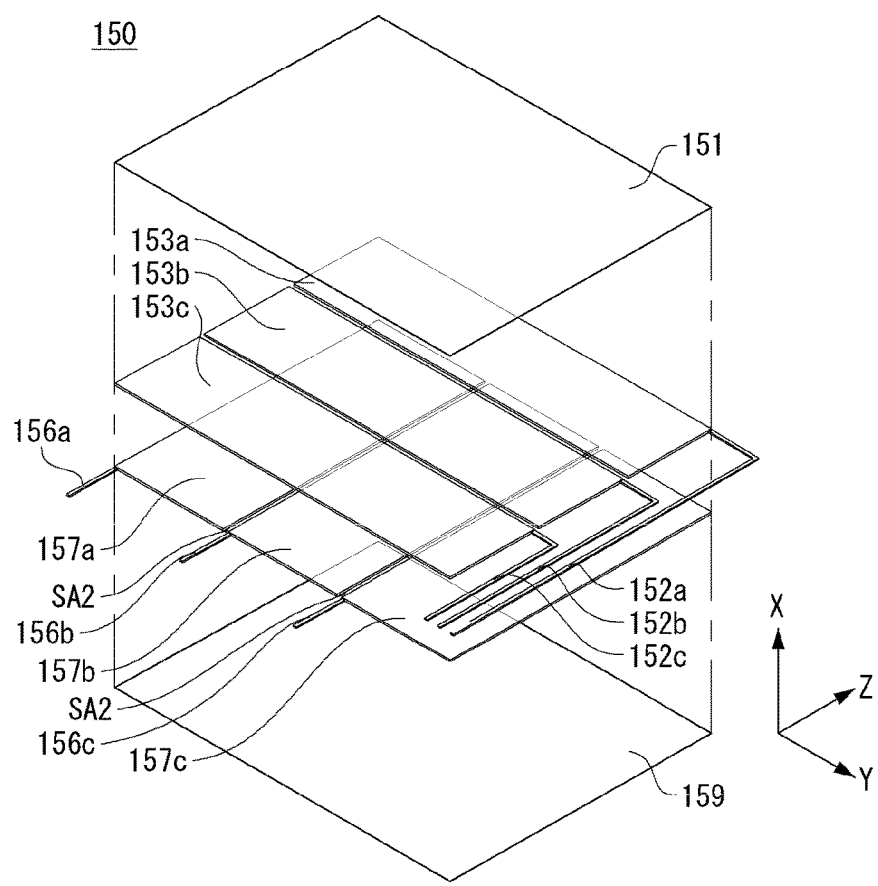

As shown in FIG. 11, a plurality of division areas operating independently may be formed while reducing a number of divisions. Thus, a manufacturing process may be simplified.

As shown in (a) of FIG. 11, the first conductive layer 153 may include conductive layers 153a to 153c partitioned by first and second partition portions SA1 and SA2. The second conductive layer 157 may include conductive layers 157a to 157c partitioned by third and fourth partition portions SA3 and SA4.

As shown in (b) of FIG. 11, each of the first conductive layer 153 and the second conductive layer 157 may be divided into three parts, and first to ninth areas A1 to A9 may be formed due to different formation directions of the first and second partition portions SA1 and SA2 and the third and fourth partition portions SA3 and SA4. Thus, the manufacturing process may be simplified. Further, a number of electrodes may be minimized. Namely, although the nine areas are formed, only the first to sixth electrodes 152a to 152c and 156a to 156c are necessary.

According to an embodiment of the present disclosure, the transparency of at least part of the transparent display 170 may be controlled by user touch interaction. That is, the display 170 may include the touch sensor, as described above, and the touch sensor may be connected to the first electrode 152 and the second electrode 156 described with reference to FIG. 3.

More specifically, referring to (b) of FIG. 7, touch input applied to a specific area of the display panel 171 applies a predetermined control signal to the conductive layer 157b through the electrode 156b connected to the specific area when the entire shielding film 150 is transparent. Accordingly, an area of the shielding film 150, which corresponds to the conductive layer 157b, may be changed to an opaque state and the specific area of the display panel 171 appears to be opaque.

Accordingly, when the shielding film 150 is composed of a plurality of areas having transparencies that can be independently changed, the transparency of an area associated with user touch interaction, from among the plurality of areas, may be controlled independently of the transparency of neighboring areas.

A description will be given of embodiments of controlling the transparency of at least part of the display 170 through user touch interaction.

The transparency of the display 170 may be achieved based on the structure of the shielding film 150 and the structure of controlling the transparency of the shielding film 150, as described above with reference to FIGS. 3 to 11.

Controlling the transparency of the display 170 using touch input sensed by the display 170 may refer to controlling the transparency of the display 170 by controlling the transparency of a specific area of the shielding film 150 of the display 170.

Figure 12:
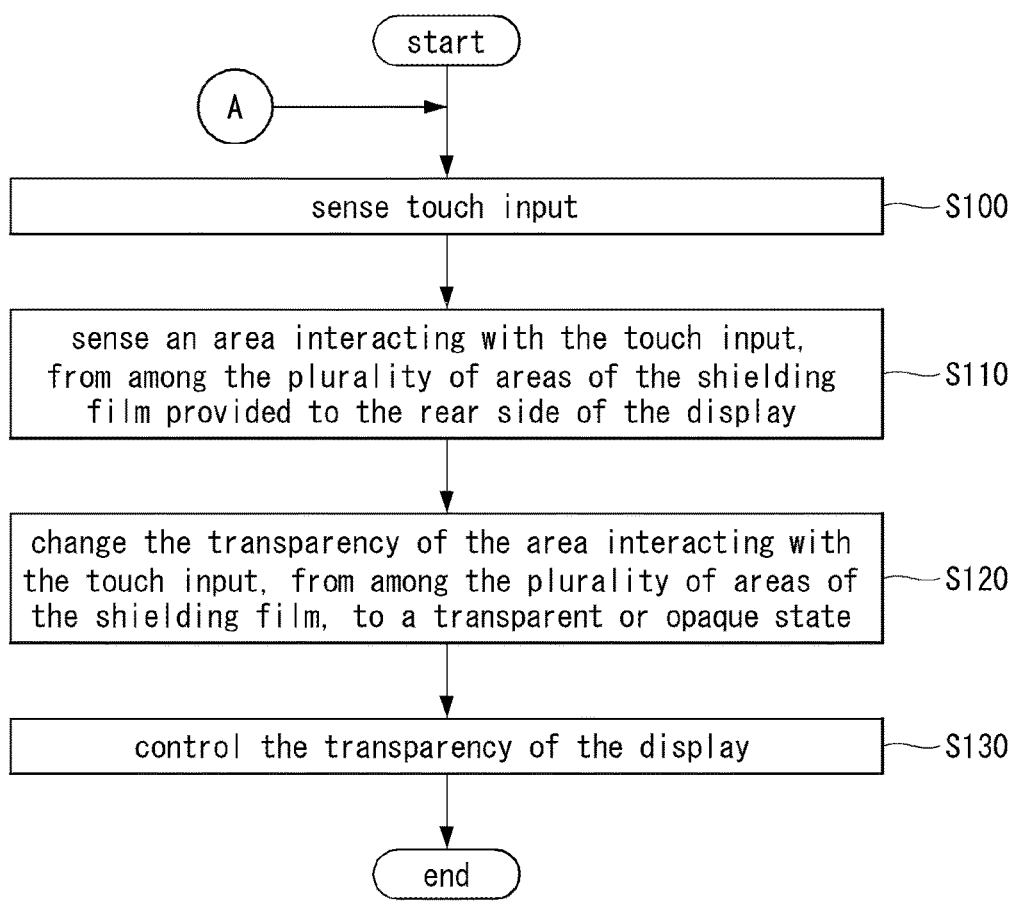
FIGS. 12 and 13 are flowcharts illustrating a method for controlling the mobile terminal according to a first embodiment of the present disclosure.
Figure 13:
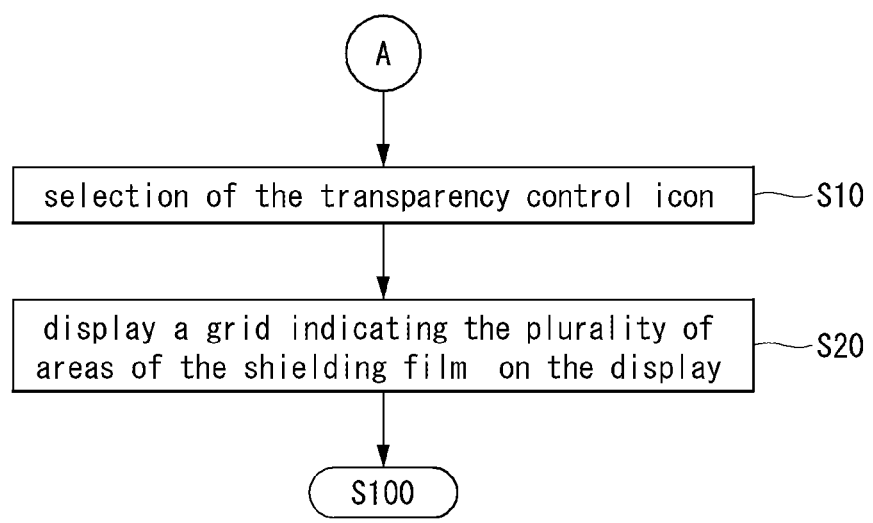

FIGS. 12 and 13 are flowcharts illustrating a method of controlling a mobile terminal according to a first embodiment of the present disclosure.

The method of controlling a mobile terminal according to the first embodiment of the present disclosure may be implemented in the mobile terminal 100 described above with reference to FIGS. 1 to 11. A description will be given of the method of controlling the mobile terminal according to the first embodiment of the present disclosure and operations of the mobile terminal to implement the method with reference to relevant drawings.

Referring to FIG. 12, the controller 180 may sense touch input applied to the display 170 having controllable transparency (S100).

The controller 180 may sense an area interacting with the touch input, from among the plurality of areas of the shielding film 150 provided to the rear side of the display 170, upon sensing the touch input (S110).

The controller 180 may change the transparency of the area interacting with the touch input, from among the plurality of areas of the shielding film 150, to a transparent or opaque state (S120). Accordingly, the controller 180 may control the transparency of the display 170 (S130).

When the shielding film 150 is divided into a plurality of areas whose transparency is independently controllable, the shielding film 150 may be provided such that the areas are visually discriminated such that the user may freely select an area whose transparency is to be controlled.

Referring to FIG. 13, the controller 180 may display a transparency control icon on the display 170 and control the display 170 to operate in a transparency control mode upon selection of the transparency control icon (S10).

The controller 180 may display a grid indicating the plurality of areas of the shielding film 150 on the display 170 upon entering the transparency control mode (S20). Since the shielding film 150 is attached to the rear side of the display 170, the grid is displayed on the display 170 to discriminate among the areas of the shielding film 150, which have independently controllable transparencies, such that the user may select a transparency control area through the grid.

A description will be given of a process of changing at least part of the transparent display 170 to an opaque state with reference to the attached drawings. In the following, the display in a transparent state is represented by reference numeral 171 and the display in an opaque state is represented by reference numeral 172.

Figure 14:
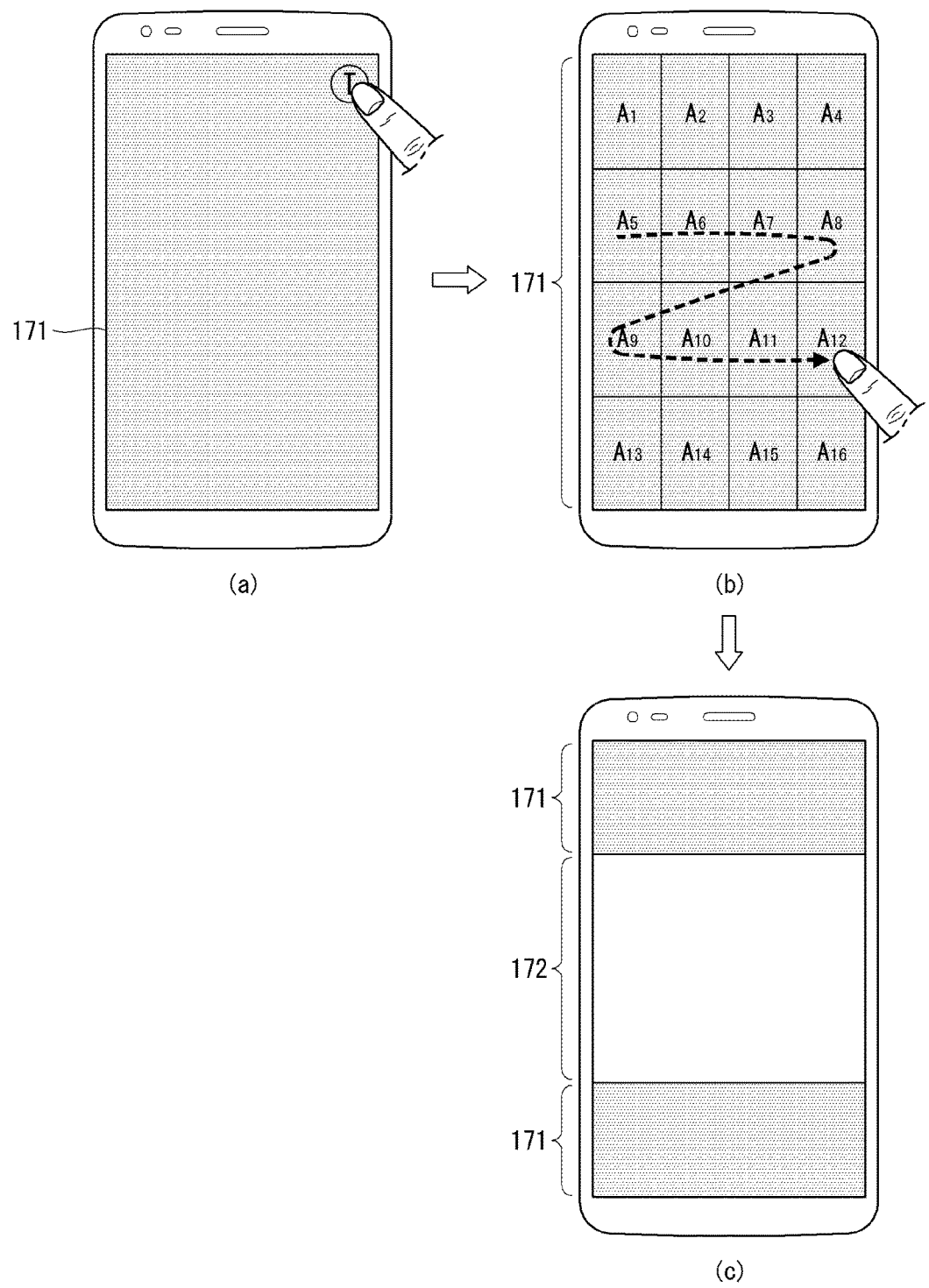
Figure 15:
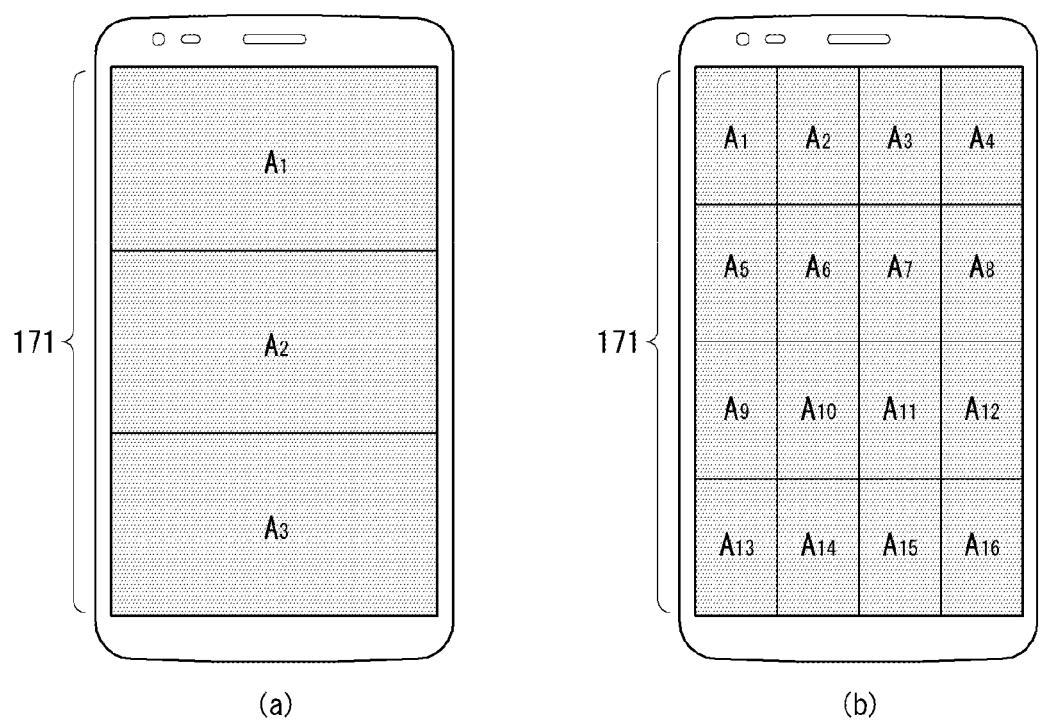

FIGS. 14, 15 and 16 are diagrams for explaining an example of controlling the transparency of at least part of the display through user touch interaction.

Referring to (a) of FIG. 14, the controller 180 may enter the transparent control mode upon selection of the transparency control icon T. In the transparency control mode, the controller 180 may provide a grid corresponding to a plurality of areas A1 to A16 to the transparent display 171, as shown in (b) of FIG. 14. As described above, the grid may be displayed on the display panel to visually indicate that the shielding film 150 is divided into the plurality of areas, instead of being displayed on the shielding film 150.

(b) of FIG. 14 shows an example of providing a grid divided into 16 areas. When drag input starting from the fifth area A5 is extended to the twelfth area A12, the controller 160 may change an area 172 to which the drag input is applied to an opaque state. An area to which the drag input is not applied may remain in a transparent state.

Referring to FIG. 15, grids in various forms may be provided in the transparency control mode. For example, the shielding film 150 may be divided into three areas A1, A2 and A3, as shown in (a) of FIG. 15, or divided into sixteen areas A1 to A16, as shown in (b) of FIG. 15. The plurality of areas of the shielding film 150 may be controlled in the shield film production stage and the number of divisions is not limited to the aforementioned example. While the number of divisions may be fixed in the shielding film production stage, the shielding film may be divided in various forms by controlling transparency block by block through user touch interaction.

For example, upon reception of drag input extended from the upper edge of the display to the lower edge thereof while a grid divided into three areas A1, A2 and A3 is provided to the display in a transparent state, as shown in (a) of FIG. 16, the controller 180 may change the entire display area of the display 170 into an opaque area 172a.

For example, upon reception of drag input forming a closed loop including four central areas A6, A7, A8 and A9 while a grid divided into 16 areas is displayed on the display in a transparent state, as shown in (b) of FIG. 16, the controller 180 may change only the areas covered by the drag input into an opaque area 172a.

Referring to (c) of FIG. 16, upon sensing drag input covering areas A4, A8, A12 and A16 in the grid having 16 divided areas, as shown in (b) of FIG. 15, only the right edge of the display may be changed to an opaque area 172c.

In the case of (d) of FIG. 16, when areas A3, A2 and A1 in a grid having 9 divided areas are sequentially dragged, the areas A3, A2 and A1 may be changed to an opaque area 172d. That is, it may be possible to obtain the same effect as in a case in which only area A1 in the grid having three divided areas, as shown in (a) of FIG. 15, is changed into an opaque state. As the number of divisions of the shielding film 150 increases, a wide variety of opaque area arrangement states may be achieved through user touch interaction.

Figure 19:
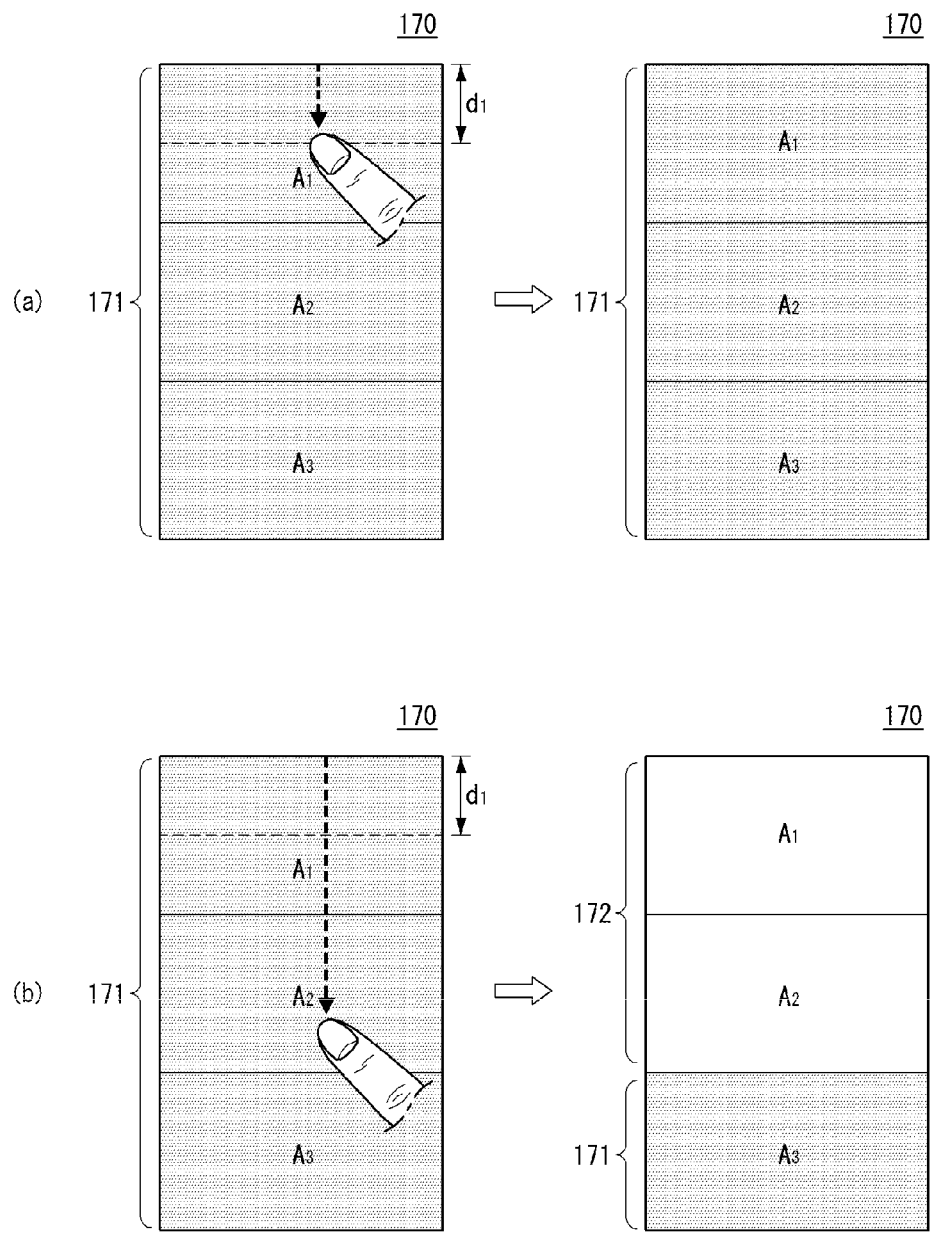

FIGS. 17, 18 and 19 are diagrams for explaining an example of controlling the transparency of at least part of the display according to touch interaction pattern of the user. The mobile terminal 100 according to an embodiment of the present disclosure may control an area of the display 170, transparency of which is controlled according to touch interaction pattern of the user.

Referring to (a) of FIG. 17, upon reception of drag input having a first length, which is applied to the front side of the display 170 in a transparent state, an area corresponding to the first length may be changed into an opaque state. Accordingly, the display 170 may be divided into the opaque area 172 corresponding to the drag input and a transparent area 171 that is not associated with the drag input.

The drag input may be applied to the rear side of the display 170.

Referring to (b) of FIG. 17, upon reception of drag input having the first length, which is applied to the rear side of the display 170, a central area corresponding to the first length may be changed to an opaque area 172 and the other area may remain as the transparent area 171.

The aforementioned drag input may include drag input simultaneously sensed from the front side and the rear side of the display 170. Upon simultaneous reception of drag input through the front side and the rear side of the display 170, the controller 180 may change the entire area of the display 170 into a transparent state or an opaque state.

For example, referring to (a) of FIG. 18, upon simultaneous sensing of drag input from both sides (front side and rear side) of an opaque area 172 when the display 170 is divided into a transparent area 171 and the opaque area 172, the controller 180 may change the entire area of the display 170 to a transparent area 171.

Referring to (b) of FIG. 18, upon simultaneous sensing of drag input from both sides (front side and rear side) of an opaque area 171 when the entire area of the display 170 remains as the opaque area 171, the controller 180 may change the entire area of the display 170 to a transparent area 171. When drag input is sensed again from both sides of the display in this state, the controller 180 may change the entire area of the display 170 to an opaque area 172.

That is, when both-sided drag input is applied, the range of control of transparency may correspond to the entire area of the display 170 irrespective of the length or direction of the drag input.

When drag input is sensed through one of the front side and rear side of the display 170, distinguished from both-sided drag input shown in FIG. 18, a transparent or opaque state may be controlled in response to the length of the drag input.

For example, referring to (a) of FIG. 19, the shielding film 150 divided into three areas is provided and thus the display 170 may be divided into first, second and third areas A1, A2 and A3. When the length of drag input starting from the first area A1 is shorter than a predetermined threshold length dl, the controller 180 maintains the entire area A1, A2 and A3 of the display 170 as a transparent area 171.

Referring to (b) of FIG. 19, when the length of drag input starting from the first area A1 exceeds the threshold length dl to be extended to the second area A2 neighboring the first area A1, the controller 180 may change the first and second areas A1 and A2 to an opaque area 172.

While an example of changing at least part of the display 170 into an opaque area has been described with reference to FIGS. 17, 18 and 19, change to an opaque area is implemented in such a manner that a specific area of the shielding film 150 attached to the rear side of the display panel is changed to a transparent state or an opaque state and thus the user may see the display 170 in a transparent or opaque state, as described above. A detailed description will be given of operation of the display panel to change a specific area of the shielding film to an opaque state with reference to FIG. 20.

Figure 20:
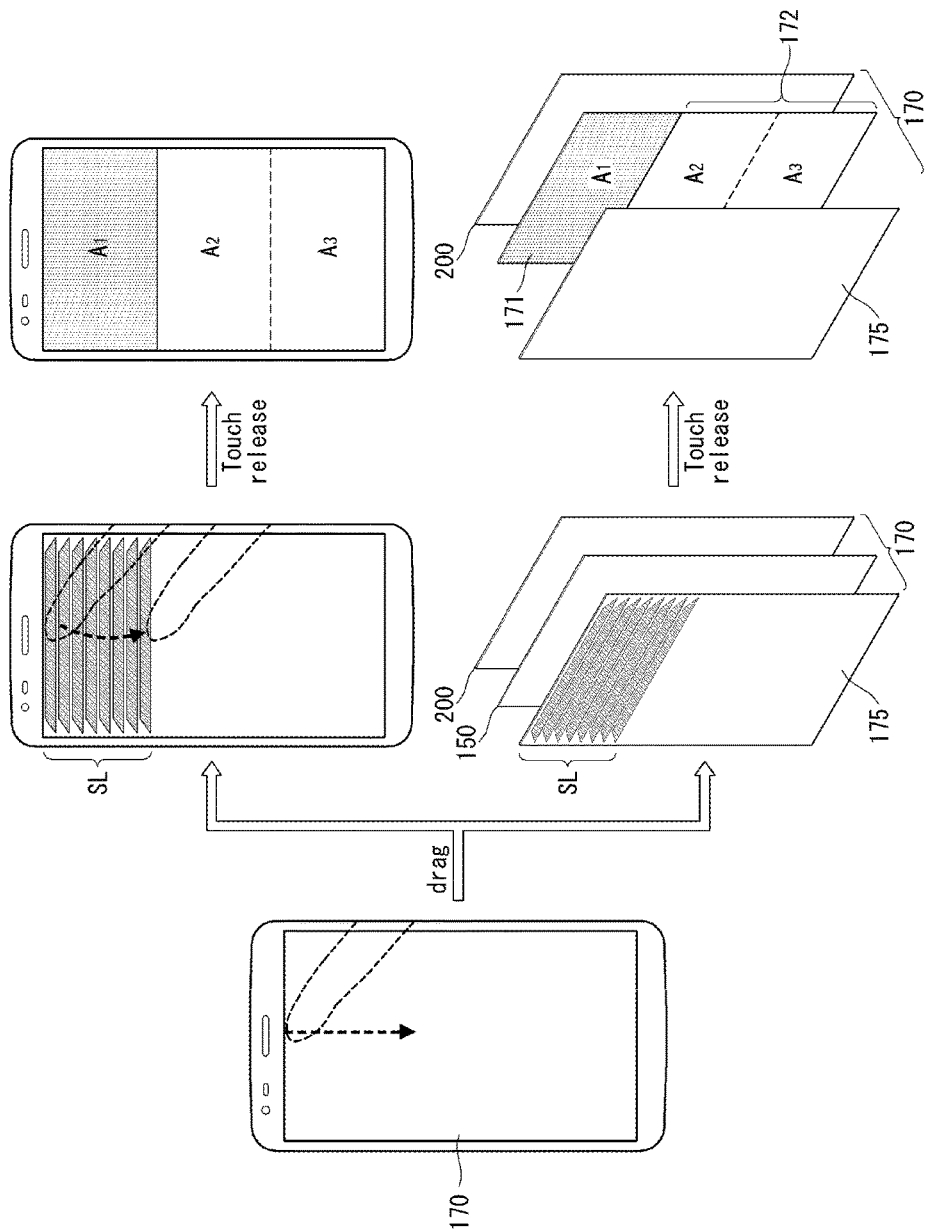
FIG. 20 is a diagram for explaining an example of controlling the transparency of a transparent display according to user touch interaction according to an embodiment of the present disclosure in more detail.

Referring to FIG. 20, when touch input is extended in a first direction on the front side or rear side of the display 170 (drag input in the first direction), the controller 180 may display a layer SL creating a shielding effect on the display 170 in such a manner that the layer SL slides in the first direction. The shielding layer SL is provided on the display panel 175 in front of the shielding film 150, instead of the shielding film 150. Upon release of the touch input, the controller 180 changes an area A1 of the shielding film 150, which corresponds to the shielding layer SL, to an opaque state. The other areas A2 and A3 remain in a transparent state.

Simultaneously, the controller 180 removes the shielding layer SL displayed on the display panel 175. Here, the shielding layer SL displayed on the display panel 175 may be provided as a predetermined graphical object. For example, the shielding layer SL may be displayed on the display panel 175 as if a curtain is lowered. The shielding layer display form is not limited to the aforementioned example and may be implemented in various manners.

Figure 21:
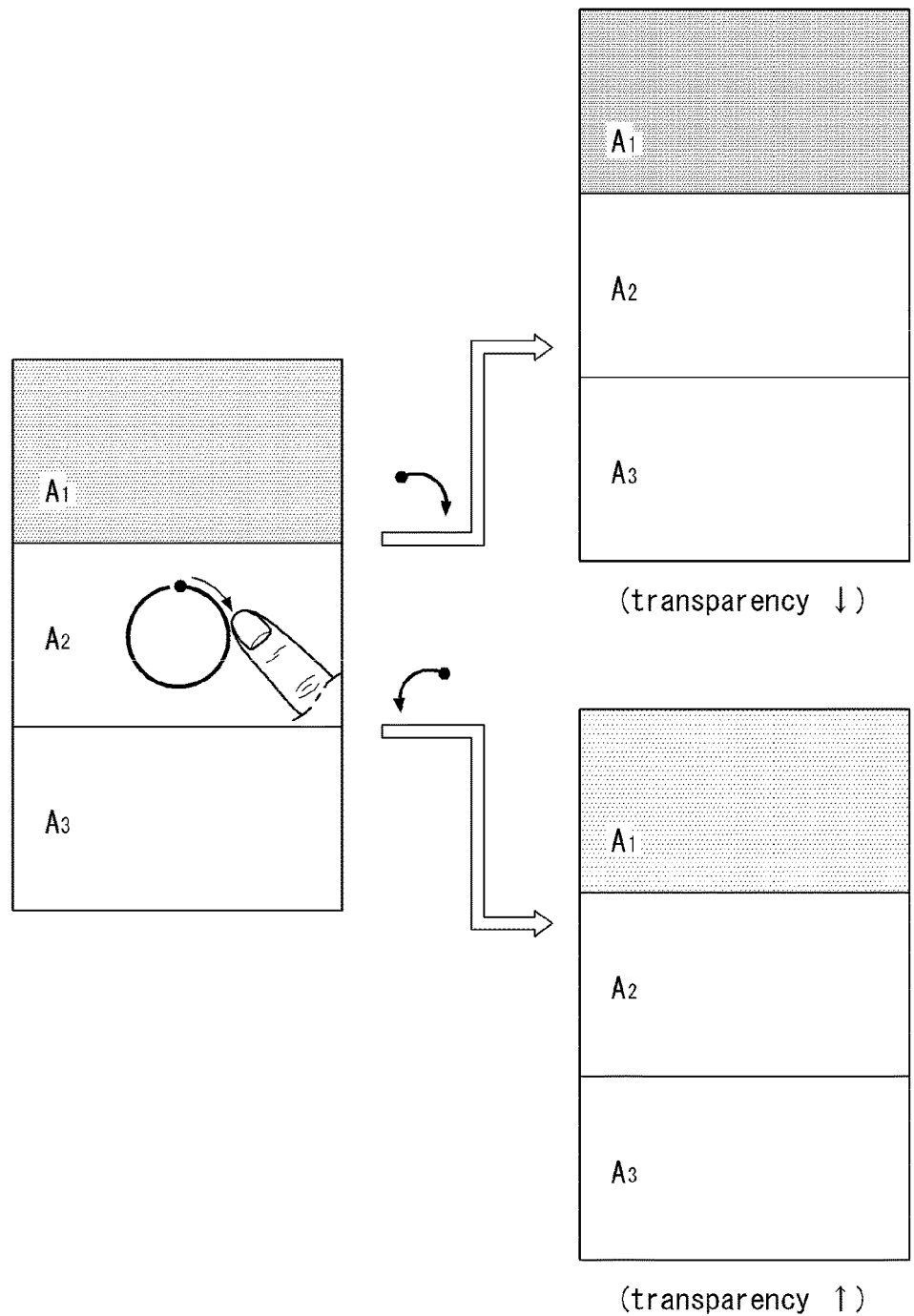
FIG. 21 is a diagram for explaining another example of controlling the transparency according to user touch interaction.

FIG. 21 is a diagram for explaining another example of controlling transparency according to user touch interaction. p Referring to FIG. 21, when at least part A1 of the display 170 has been changed to an opaque area, the controller 180 may control the transparency of the opaque area within a predetermined range according to a touch pattern having specific directivity (e.g. clockwise or counterclockwise touch input). For example, upon reception of clockwise drag input applied to an arbitrary area of the display 170 when the first area A1 has been changed into an opaque state, the transparency of the first area A1 may further decrease (that is, opacity thereof increases). Upon reception of counterclockwise drag input, the transparency of the first area A1 may further increase.

Figure 22:
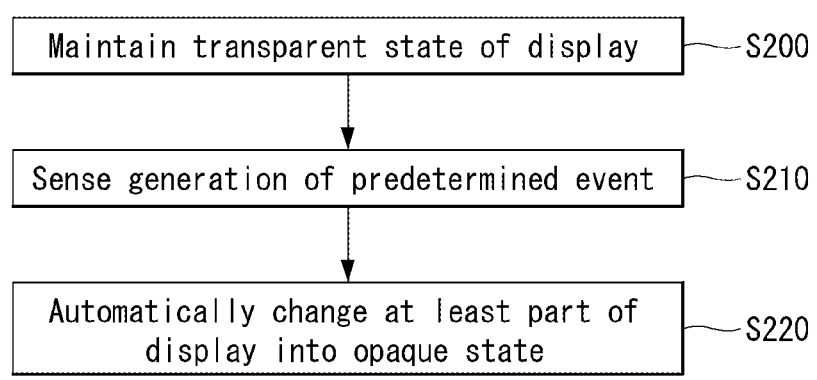
FIG. 22 is a flowchart illustrating a method for controlling the mobile terminal according to a second embodiment of the present disclosure.

FIG. 22 is a flowchart illustrating a method of controlling a mobile terminal according to a second embodiment of the present disclosure and FIGS. 23 to 32 are diagrams for explaining operations of the mobile terminal according to the second embodiment of the present disclosure.

The second embodiment of the present disclosure describes examples in which at least part of the display is automatically changed to an opaque area when a predetermined condition is satisfied or a predetermined event is generated in the display in a transparent state.

The method of controlling a mobile terminal according to the second embodiment of the present disclosure may be implemented in the mobile terminal 100 described above with reference to FIGS. 1 to 11. A description will be given of the method of controlling the mobile terminal according to the second embodiment of the present disclosure and operations of the mobile terminal 100 to implement the method with reference to relevant drawings. The second embodiment may be implemented based on the first embodiment.

Referring to FIG. 22, the controller 180 controls the display 170 to remain in a transparent state (S200). That is, the controller 180 may control the display 170 to display the home screen HS and the execution screen of a specific application in a transparent state.

The controller 180 may sense generation of a predetermined event in a state in which the display 170 is transparent (S210). The predetermined event may refer to a case in which the display 170 displays a predetermined screen.

For example, when a screen displaying personal privacy, a screen that requires security or a screen whose visibility needs to be increased is displayed on the display 170 in the transparent state, the controller 180 changes the display 170 into an opaque state such that a third person located behind the display 170 cannot view information displayed on the display 170.

Figure 23:
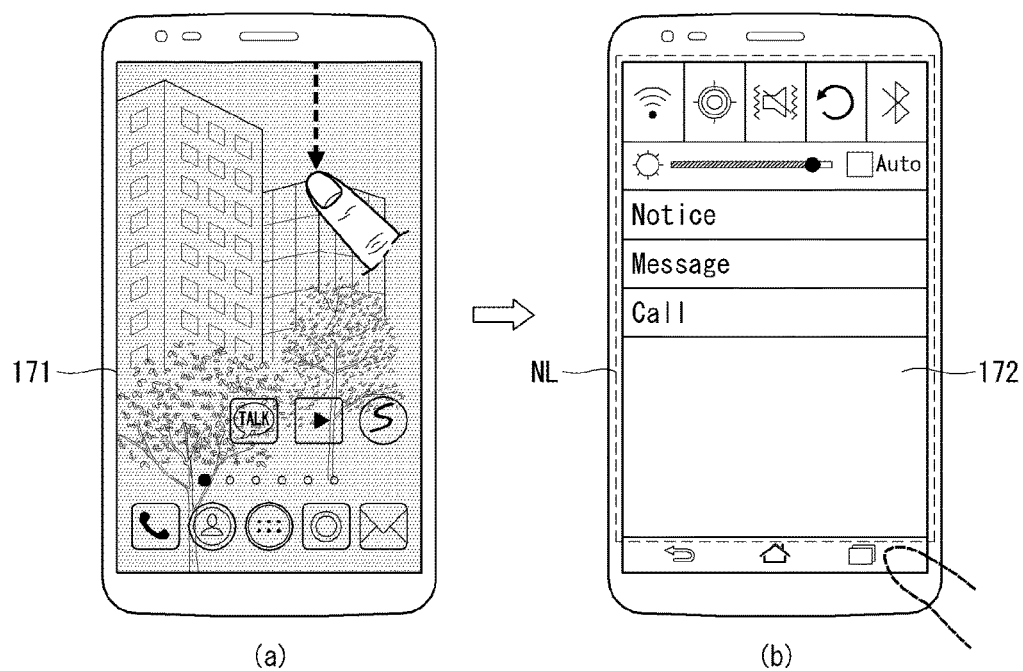

Referring to FIG. 23, upon reception of input of dragging down a status bar of the mobile terminal 100 while the home screen HS is displayed in a transparent area 171 of the display 170, a notification layer NL may slide to be displayed on the display 170.

The notification layer NL may include various types of state information and notification information of the mobile terminal 100. The state information may include menu items indicating Wi-Fi connection state, locating function activation, bell activation, Bluetooth connection activation and the like. The notification information may indicate unconfirmed messages and missed calls. Since the notification information may include personal information that requires privacy protection, the controller 180 may automatically change the display 170 into an opaque state when the notification layer NL needs to be displayed on the display 170.

Figure 24:
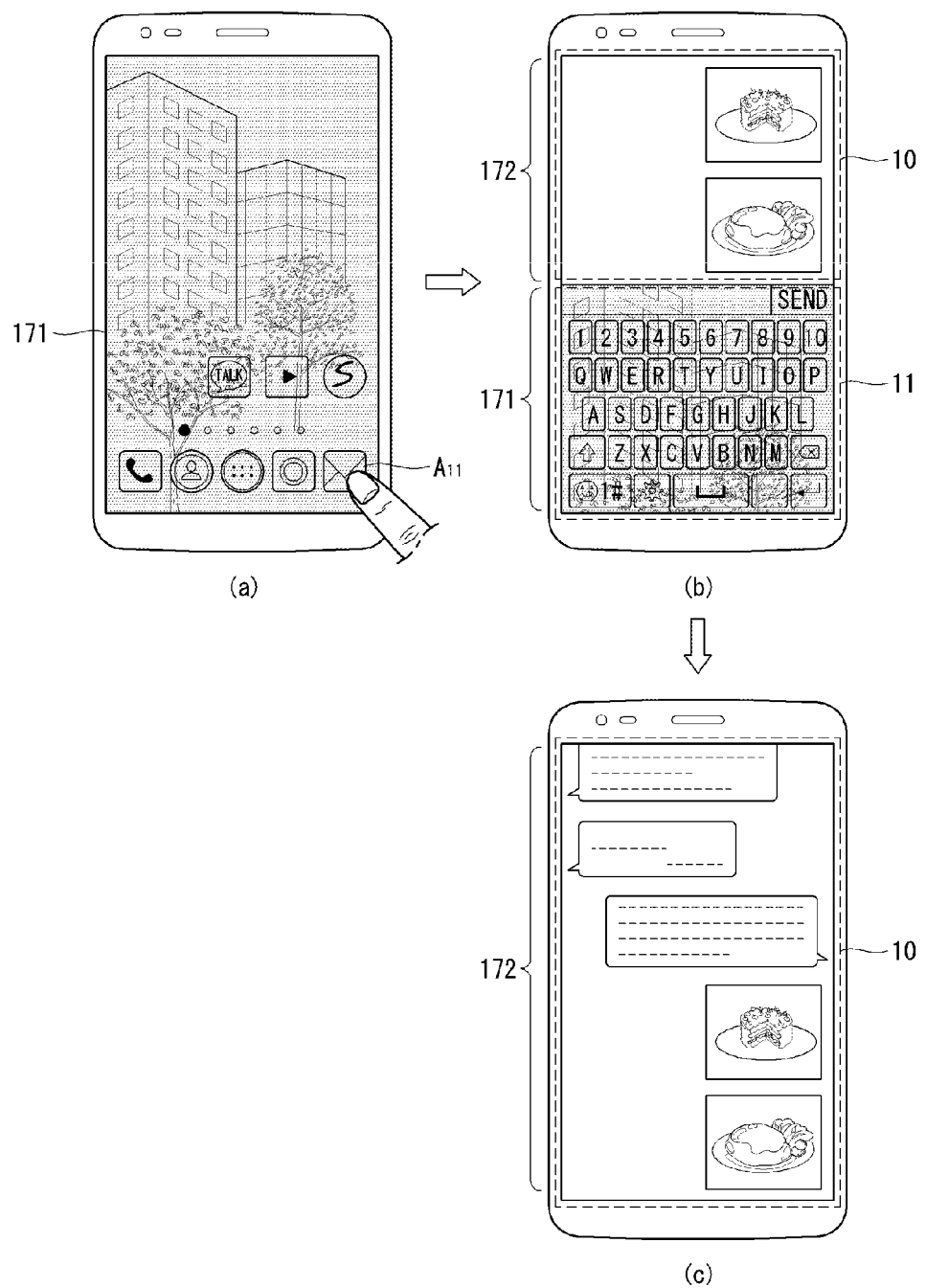

Referring to FIG. 24, upon selection of a messenger application icon A11 while the home screen HS is displayed in the transparent area 171 of the display 170 ((a) of FIG. 24), a messenger application execution screen may be displayed on the display 170. The messenger application execution screen may include a chat window 10 and a keypad 11 for text input. The controller 180 may automatically change the chat window 10 to an opaque area 172 when the messenger application execution screen is displayed ((b) of FIG. 24). That is, privacy may be enhanced such that content of conversation is not exposed to other people by changing the chat window 10 to an opaque area.

Accordingly, the transparent area 171 and the opaque area 172 may coexist in the display 170. When the keypad 11 is removed from the display 170 through user input, the chat window 10 is extended to the transparent area 171 and thus the entire area of the display 170 may be changed to the opaque area 172.

Figure 25:
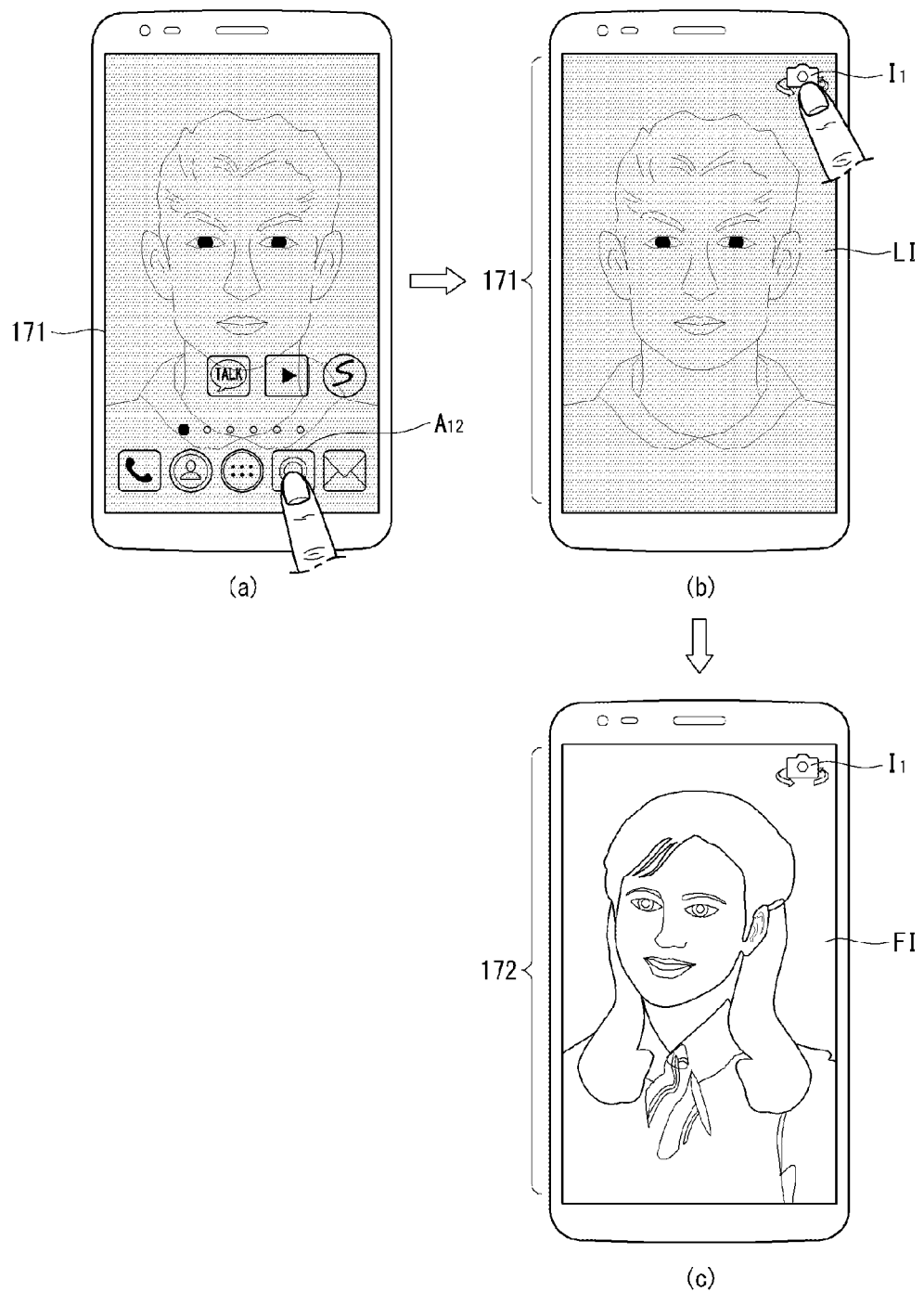

Referring to FIG. 25, upon selection of a camera application icon A12 while the home screen HS is displayed in the transparent area 171 of the display 170 ((a) of FIG. 25), the camera 121b (rear camera shown in FIG. 2B) is driven. A preview image captured by the rear camera 121b is displayed through the transparent area 171 of the display 170 ((b) of FIG. 25). In this case, a relevant person located behind the mobile terminal 100 may see the preview image corresponding to an image LI of the person, which is being captured by the camera, through the transparent area 171 of the display 170. The controller 180 may provide a front/rear camera change icon I1 along with the preview image. Upon selection of the front/rear camera change icon I1, a preview image FI captured by the front camera 121a (refer to FIG. 2A) instead of the rear camera 121b is provided to the display 170. The controller 180 changes the entire area of the display 170 into an opaque area 172 when the rear camera 121b changes to the front camera 121a and displays the image captured by the front camera 121a in the opaque area 172 ((c) of FIG. 25). That is, the controller 180 may control the transparency of the display 170 according to which one of the front camera and the rear camera included in the mobile terminal 100 is driven. When the front camera is driven, the controller 180 may change the display 170 into an opaque state to improve visibility of preview images and to protect privacy of the mobile terminal user.

Figure 26:
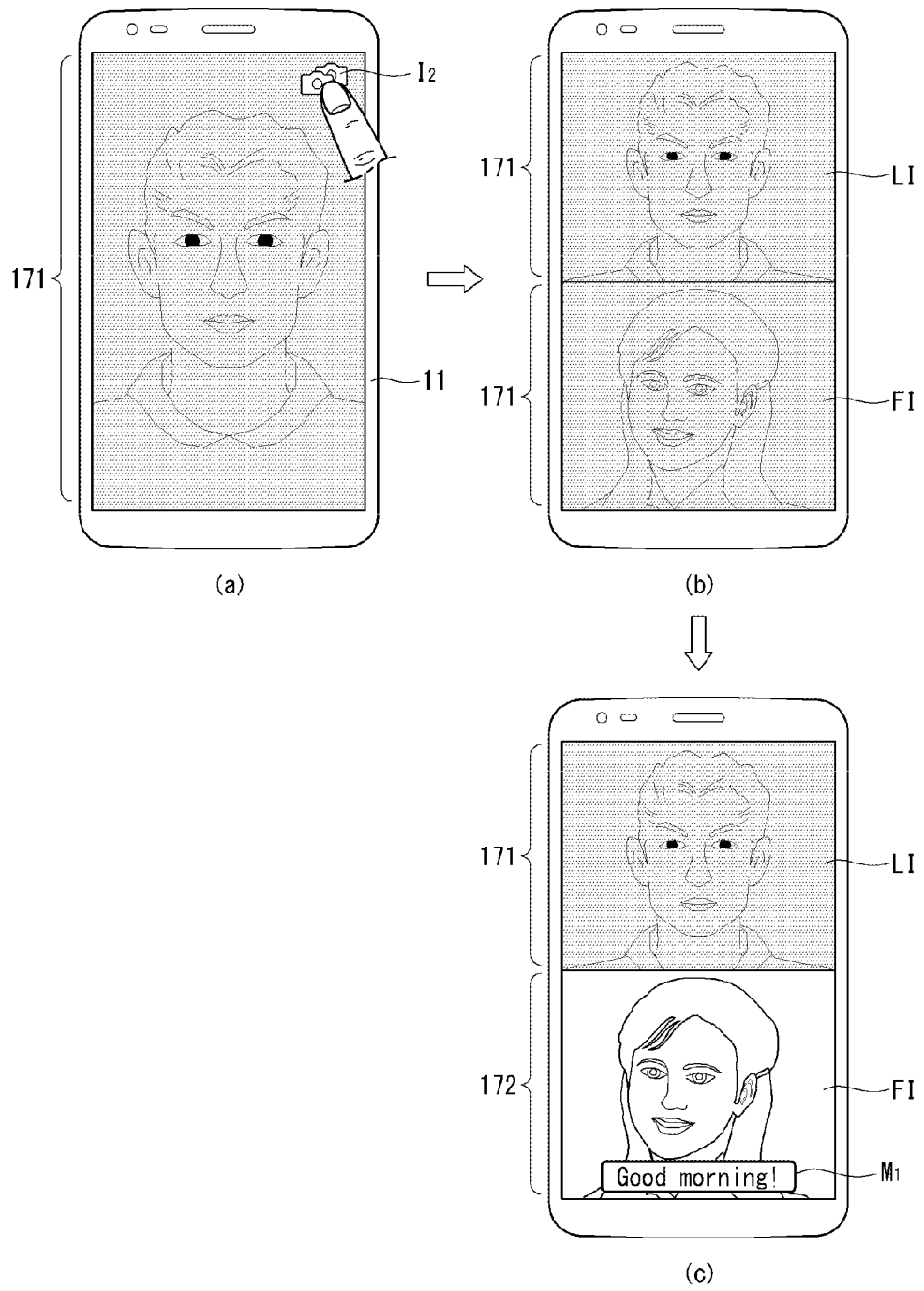

Referring to FIG. 26, the mobile terminal 100 may simultaneously display images acquired through the front camera and the rear camera on the display 170 by simultaneously driving the two cameras, distinguished from the example shown in FIG. 25.

That is, upon selection of a dual mode icon I2 while the image LI captured by the rear camera 121b is displayed in the transparent area 171 of the display 170 ((a) of FIG. 26), the controller 180 may divide the display 170 into a first area and a second area, display the image LI captured by the rear camera in the first area and display the image FI captured by the front camera in the second area ((b) of FIG. 26). The first area and the second area may be provided by dividing the display screen of the display 170 into upper and lower parts.

In this state, the mobile terminal 100 may sense an event generated according to communication with an external device. For example, the event may be message reception from the external device. Upon reception of the message, the controller 180 may change the second area in which the image FI captured by the front camera is displayed to an opaque area 172 and display the received message M1 in the second area ((c) of FIG. 26). Accordingly, privacy may be enhanced such that the received message M1 is not exposed to other people.

Figure 27:
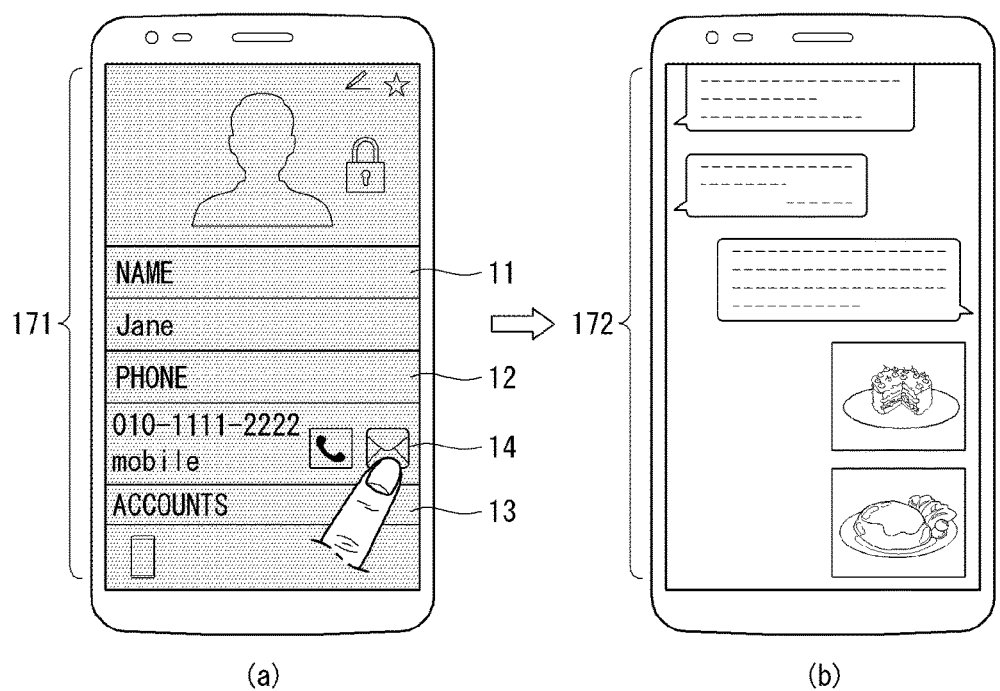
Figure 28A:
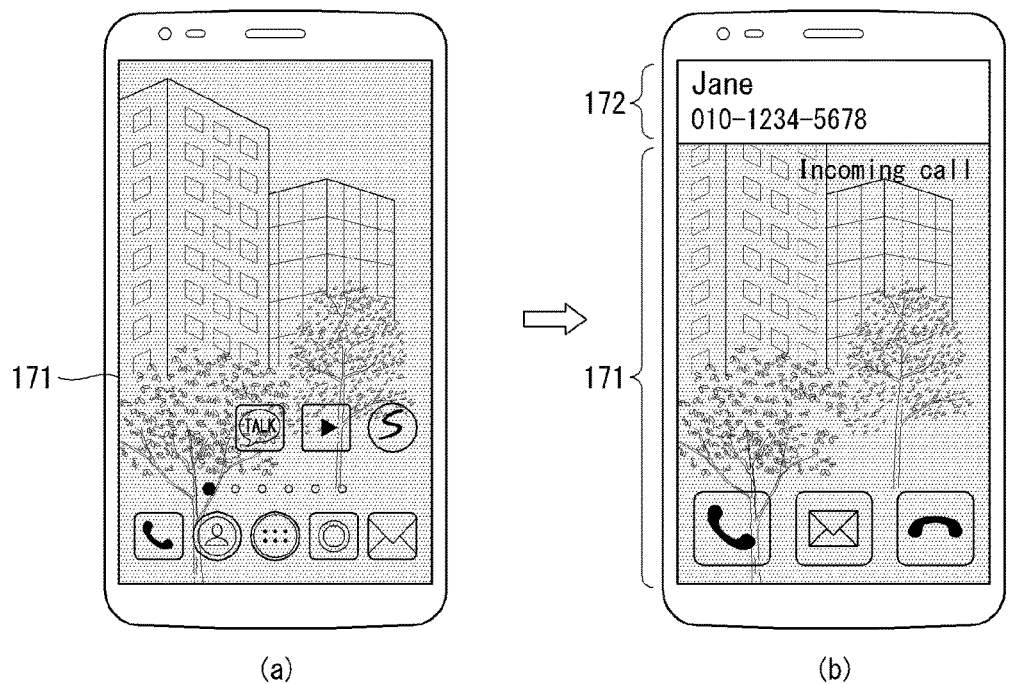
Figure 28B:
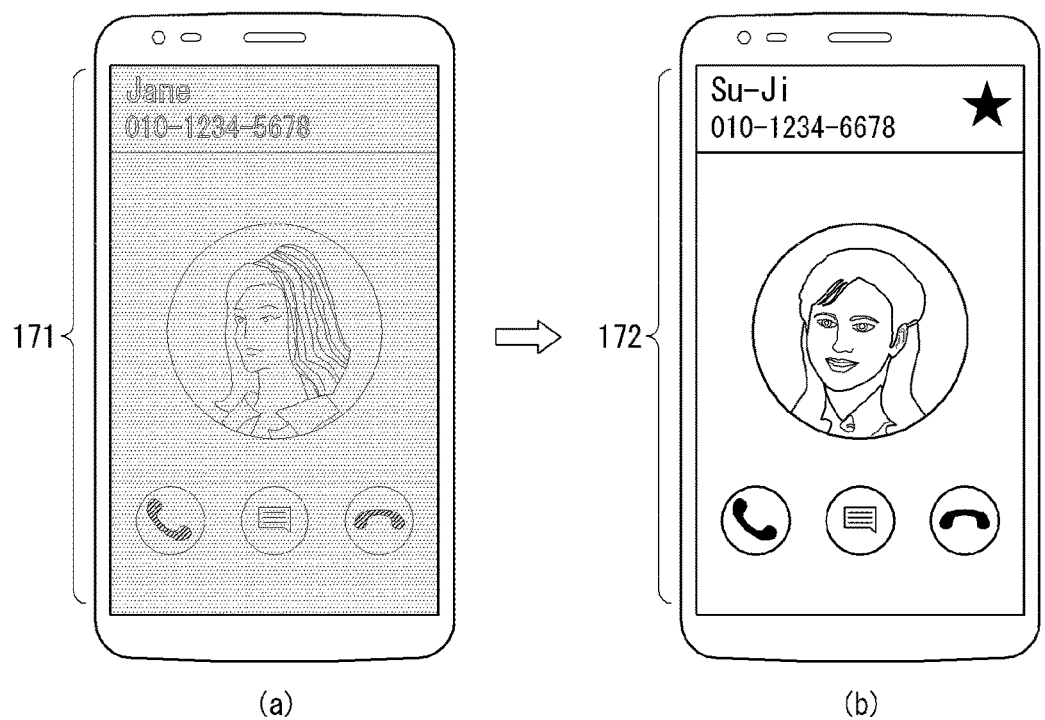

Referring to FIG. 27, a screen including personal information may be displayed on the display 170 in a transparent state. The personal information is items included in contact information and may include a name 11, a phone number 12, an account number 13, a message icon 14 and the like ((a) of FIG. 27). The screen including the personal information is a screen displayed before the personal information is exposed, and the controller 180 may provide such information to the transparent area 171. Upon selection of the message icon 14, the controller 180 changes the transparent area 171 to an opaque area 172 and displays content of conversation with the other party in the opaque area 172. Referring to FIG. 28A, upon reception of a call while the display 170 is in a transparent state, the controller 180 may change an area in which sender information is displayed to an opaque area 172 by controlling the transparency of a call waiting screen and maintain the remaining area as the transparent area 171. Accordingly, visibility of the opaque area is enhanced to improve readability of the sender information. Referring to FIG. 28B, the controller 180 may use the frequency of telephone conversation with a specific sender as a transparency control criterion. For example, upon reception of a call from a first sender having a low conversation frequency, the controller 180 controls the display 170 to have first transparency. Upon reception of a second sender having a high conversation frequency, the controller 180 controls the display 170 to have second transparency lower than the first transparency to improve visibility of the call waiting screen.

Figure 29A:
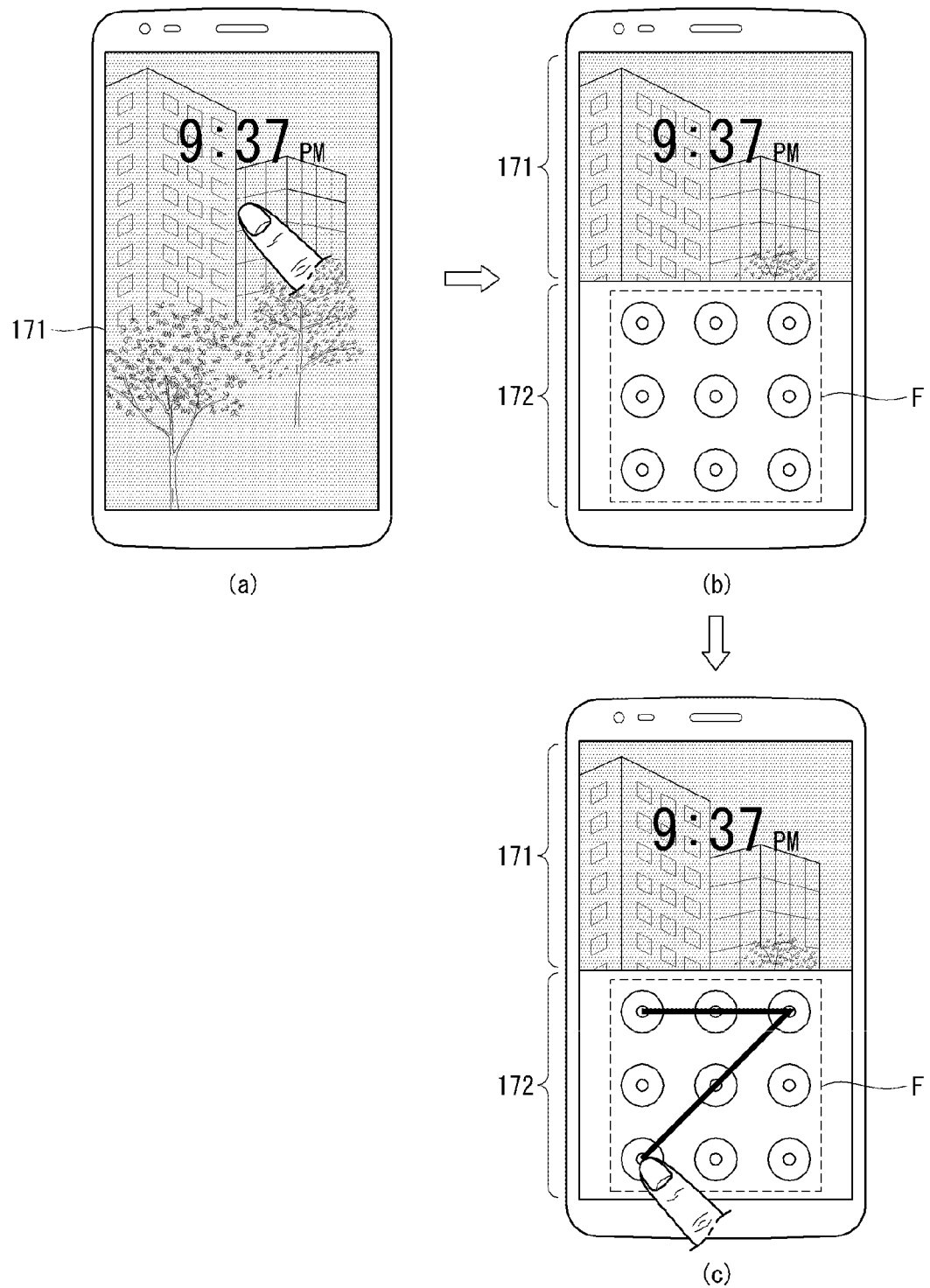
Figure 29B:
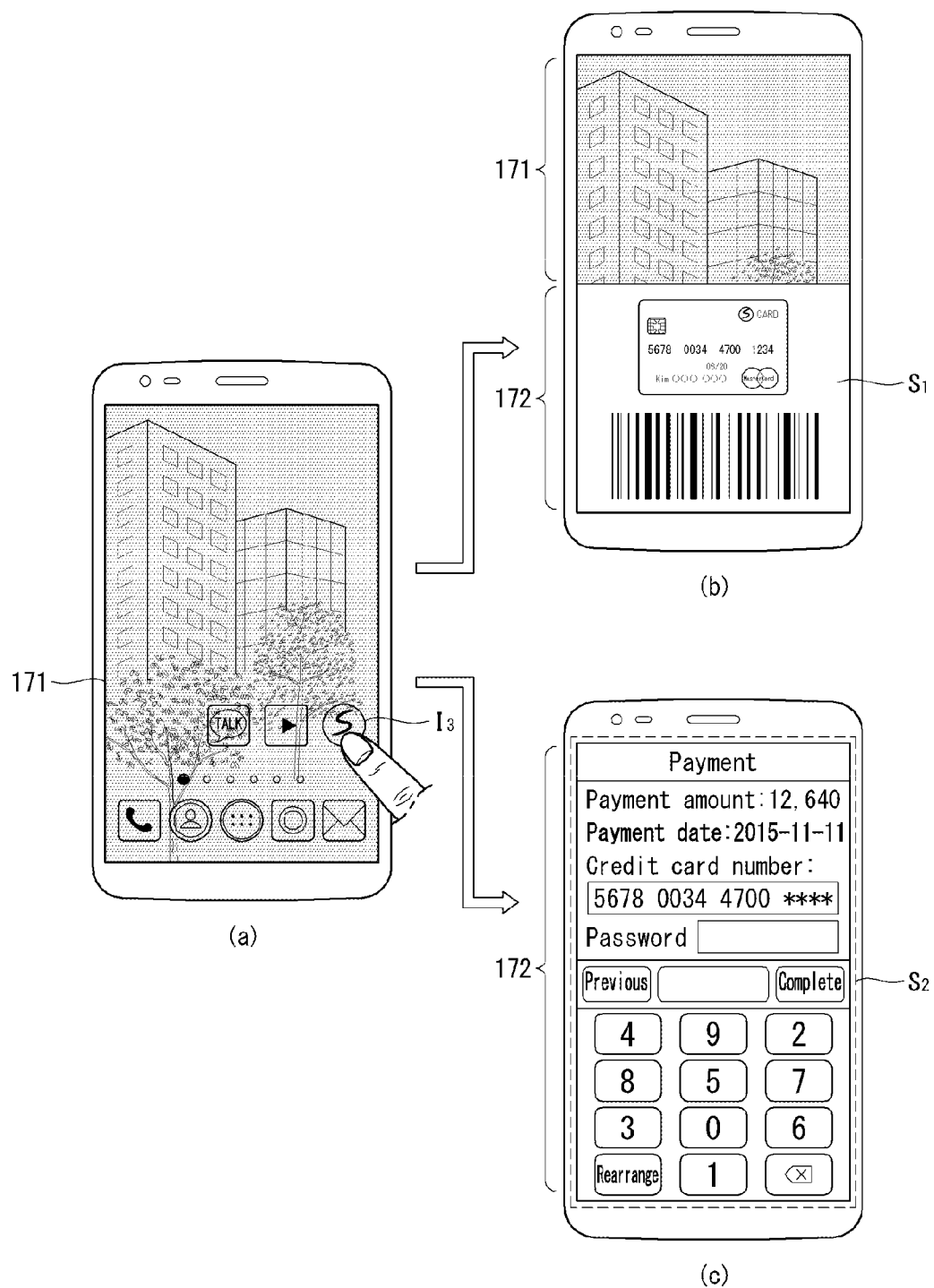

FIGS. 29A and 29B show examples of changing at least part of the display 170 into an opaque state to enhance security.

Referring to FIG. 29A, a lock screen may be provided to the transparent area 171 when the display 170 is in a transparent state (a).

The lock screen may include only minimum information such as time information, date information and battery charge information. Upon reception of touch input applied to the lock screen, the controller 180 may provide an unlock screen F for releasing the lock state to the display 170. When the unlock screen F is displayed in the transparent area 171, an unlock pattern may be exposed to a person located behind the mobile terminal 100. Accordingly, the controller 180 automatically changes the area displaying the unlock screen F to an opaque area 172 (b).

Upon input of the unlock pattern to the unlock screen F displayed in the opaque area 172 (c), the controller 180 may release the lock state. The controller 180 may change the display 170 into a transparent state after release of the lock state and display the home screen HS on the display 170 in the transparent state, which is not shown.

Referring to FIG. 29B, a payment application icon 13 displayed in the transparent area 171 when the display 170 is in the transparent state may be selected (a).

Upon selection of the payment application icon 13, a payment associated screen (e.g. a bar-code 51 and a payment information input screen S2) may be provided to the display 170. The area in which the payment associated screen is displayed may be changed to an opaque area 172 so as to improve security of a mobile payment environment.

Figure 30:
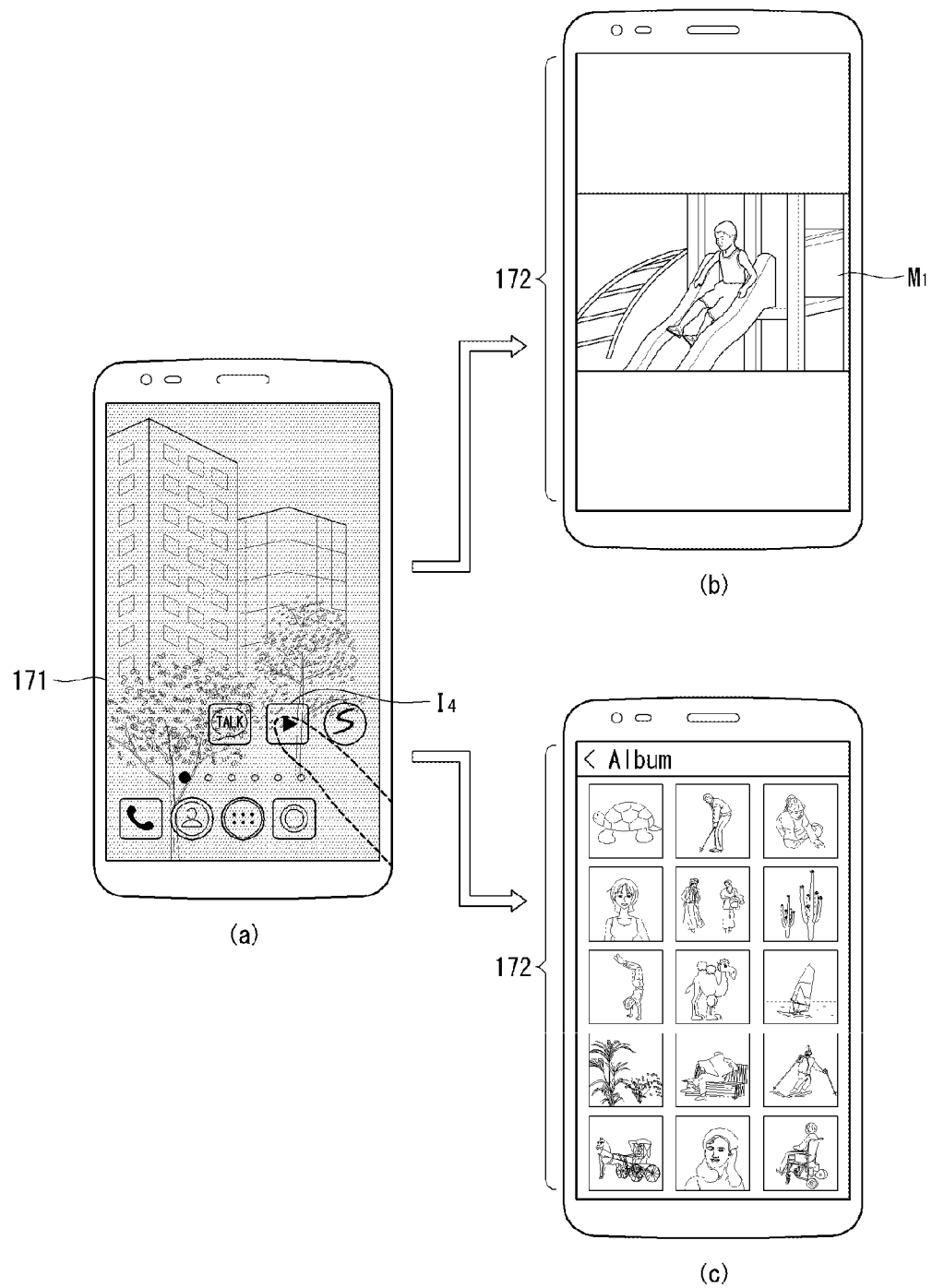

FIGS. 30 and 31 show examples of improving visibility of multimedia content by controlling the transparency of the display 170 when the multimedia content is played back or displayed through the transparent display.

Referring to FIG. 30, upon selection of a multimedia icon 14 displayed in the transparent area 171 of the display 170 (a), the controller 180 changes an area for displaying the corresponding multimedia content to an opaque area 172.

The multimedia content includes video and a video reproducing screen M1 is displayed in the opaque area 172 (b). The multimedia content may include images stored in a gallery of a gallery application and at least one image stored in the gallery may be displayed in the opaque area 172 according to execution of the gallery application (c). Accordingly, visibility of the multimedia content may be enhanced.

Referring to FIG. 31, upon execution of the camera application while the display 170 is in a transparent state, a camera preview image PI may be provided through the transparent area 171 (a). Here, upon selection of a quick view menu for checking captured images, the display 170 may be changed into an opaque area 172 and the just captured image may be displayed in the opaque area 172 (b).

Figure 32:
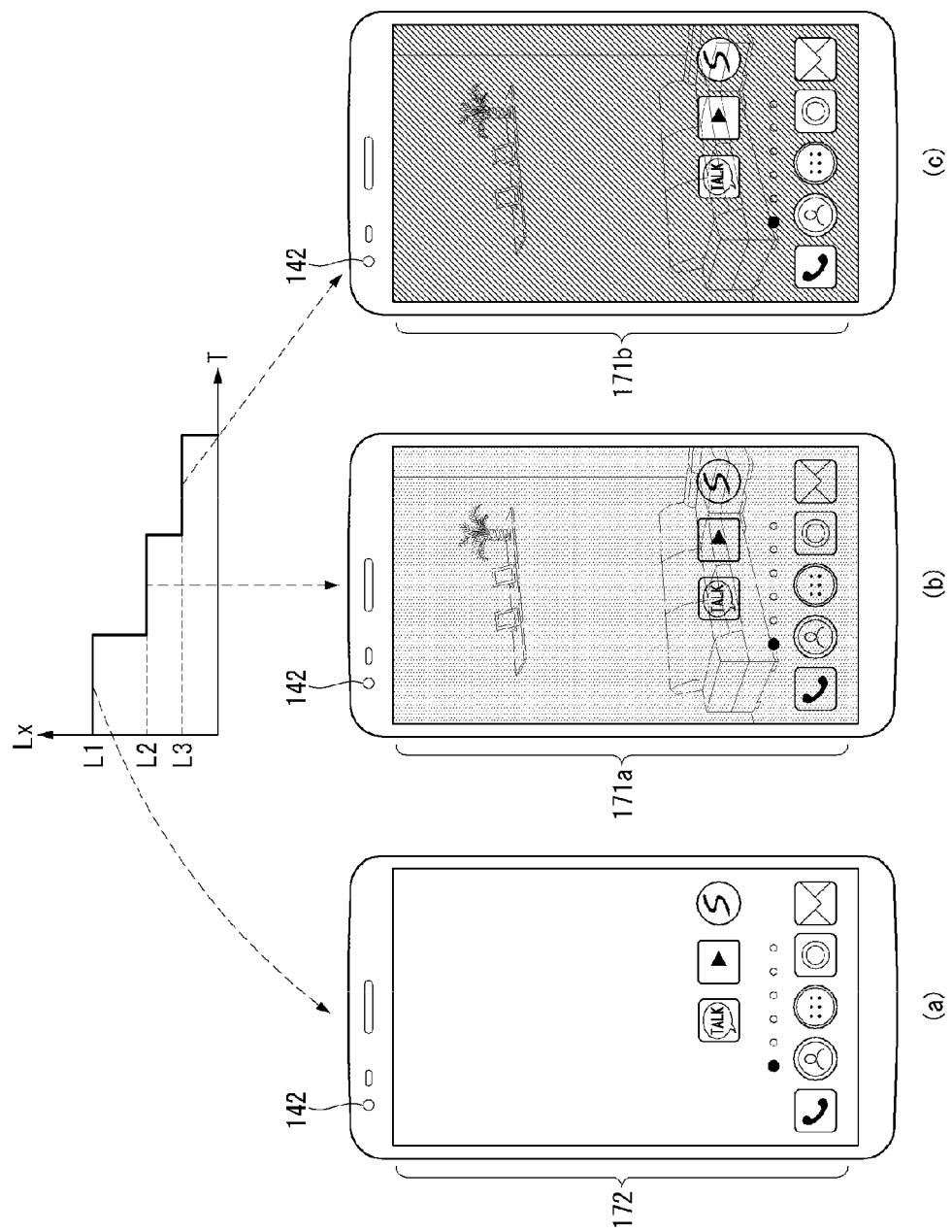

Referring to FIG. 32, the mobile terminal 100 may further include the illumination sensor 142. The controller 180 may control the transparency of the display 170 on the basis of a sensing signal of the illumination sensor 142.

For example, when an environment surrounding the mobile terminal 100 has a first luminance L1 corresponding to high luminance (for example, the surrounding environment is an outdoor space), the controller 180 may decrease the transparency of the display 170 upon determining that visibility of the display 170 needs to be secured. The controller 180 may control the display 180 to be opaque or translucent by controlling a control signal applied to the shielding film 150.

When the environment surrounding the mobile terminal 100 has a second luminance L2 lower than the first luminance L1 (for example, the surrounding environment is an indoor space), visibility of the display 170 is secured even in a transparent state and thus the display 170 may remain in the transparent state. That is, the controller 180 may maintain the display area of the display 170 as a first transparent area 171*a*.

When the environment surrounding the mobile terminal 100 has a third luminance to L3 lower than the second luminance (for example, the surrounding environment is an indoor space at night), the transparency of the display 170 may be further decreased. That is, the controller 180 may change the display area of the display 170 to a second transparent area 171*b* having higher transparency than the first transparent area 171*a*.

Figure 33:
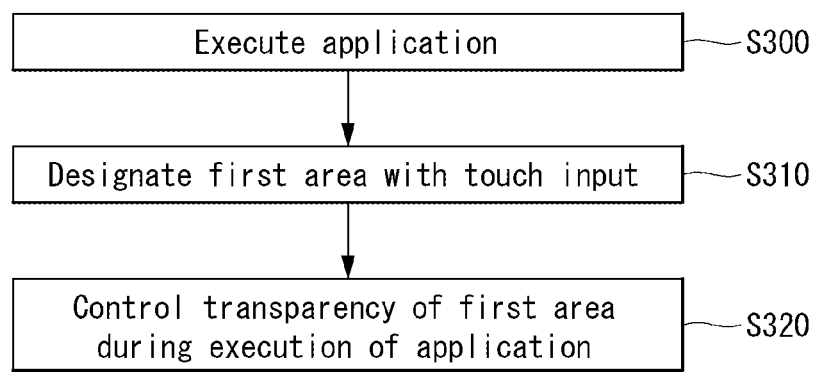
FIG. 33 is a flowchart illustrating a method for controlling the mobile terminal according to a third embodiment of the present disclosure.

FIG. 33 is a flowchart illustrating a method of controlling a mobile terminal according to a third embodiment of the present disclosure and FIGS. 34A to 35B are diagrams for explaining operations of the mobile terminal according to the third embodiment of the present disclosure.

The third embodiment of the present disclosure describes examples of changing only a specific part of an execution screen of a specific application to an opaque area without affecting execution of the application by changing an area of the application execution screen, which is selected by the user, to an opaque area while the application is executed through the transparent display.

The method of controlling a mobile terminal according to the third embodiment of the present disclosure may be implemented in the mobile terminal 100 described above with reference to FIGS. 1 to 11. A description will be given of the method of controlling the mobile terminal according to the third embodiment of the present disclosure and operations of the mobile terminal 100 to implement the method with reference to relevant drawings. The third embodiment may be implemented based on the first embodiment and/or the second embodiment.

Referring to FIG. 33, the controller 180 may execute an application (S300) and display the execution screen of the application on the display 170 in a transparent state.

The controller 180 may enter the transparency control mode while the application execution screen is displayed on the display 170 and designate a first area upon sensing touch input applied to the display 170 in the transparency control mode (S310).

The controller 180 may control the transparency of the first area during execution of the application (320).

Here, transparency control may include change from a transparent state to an opaque state and change from an opaque state to a transparent state. In addition, transparency control may also include change to a translucent state.

Figure 34A:
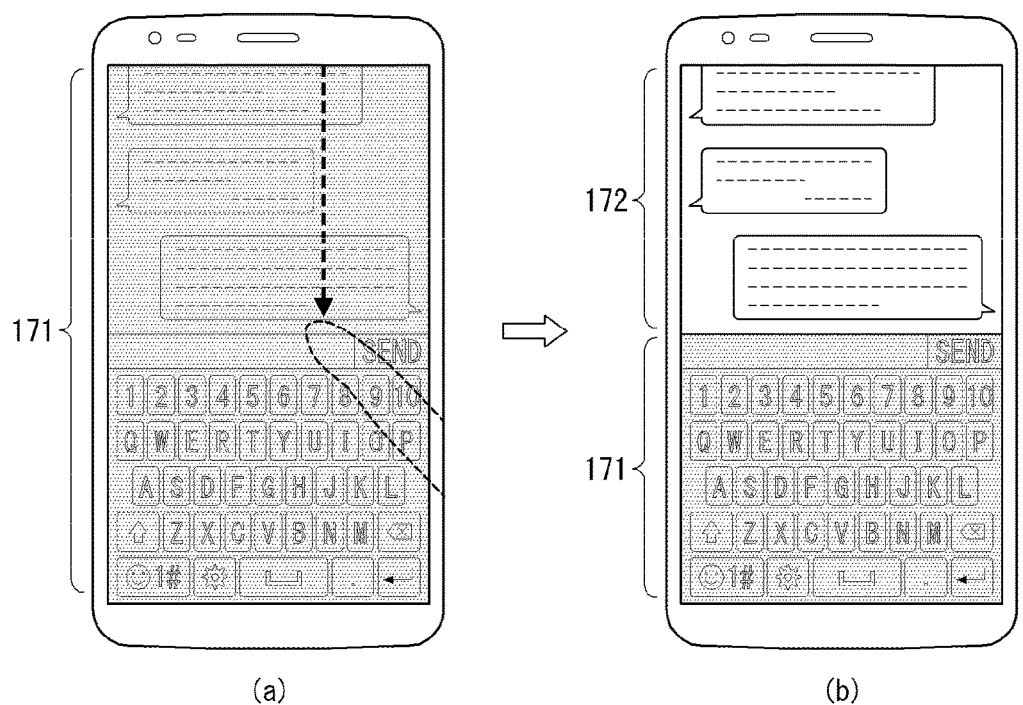
FIGS. 34A to 35B are diagrams for explaining operations of the mobile terminal according to the third embodiment of the present disclosure.

Referring to FIG. 34A, the controller 180 receives drag input applied to the rear side of the display 170 during execution of the messenger application through the display 170 in a transparent state. The controller 180 receives the drag input applied to a point of the rear side of the display 170, which corresponds to a chat window. The controller 180 changes the chat window to an opaque area 172 and maintains the keypad as a transparent area 171. Accordingly, a conversation is not exposed to a person located opposite the mobile terminal 100.

Figure 34B:
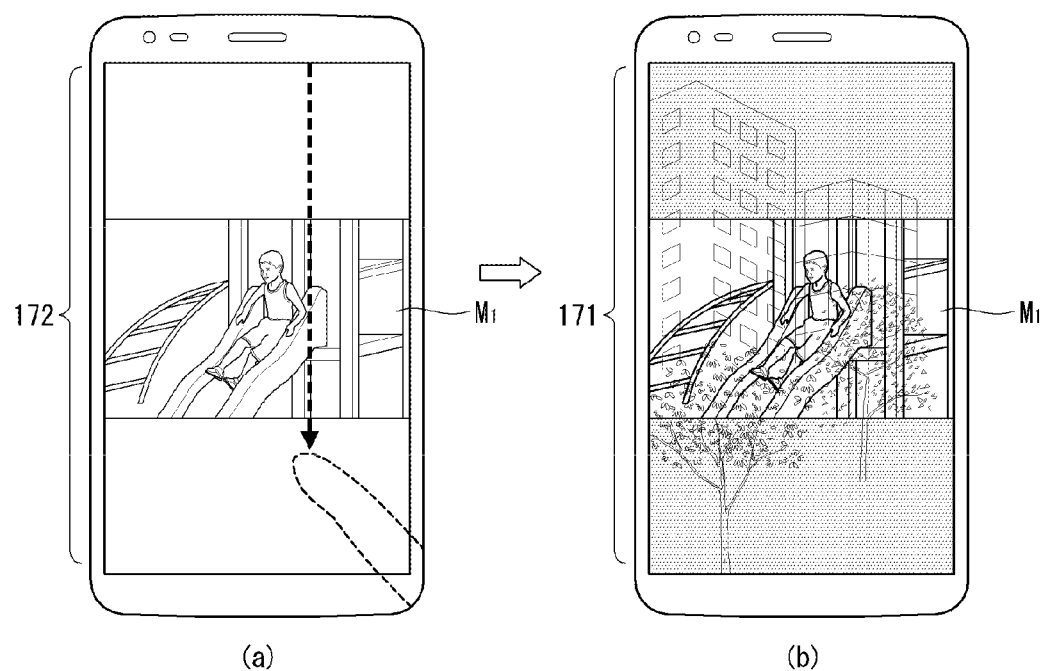

Referring to FIG. 34B, the controller 180 receives drag input applied to the rear side of the display 170 during reproduction of a video through the display 170 in an opaque state. To prevent the video from being exposed to people neighboring the user, the transparency of the display 170 needs to increase. The controller 180 may change the display area of the display 170 to a transparent area 171 in response to the drag input to slightly decrease visibility of the video.

Figure 35A:
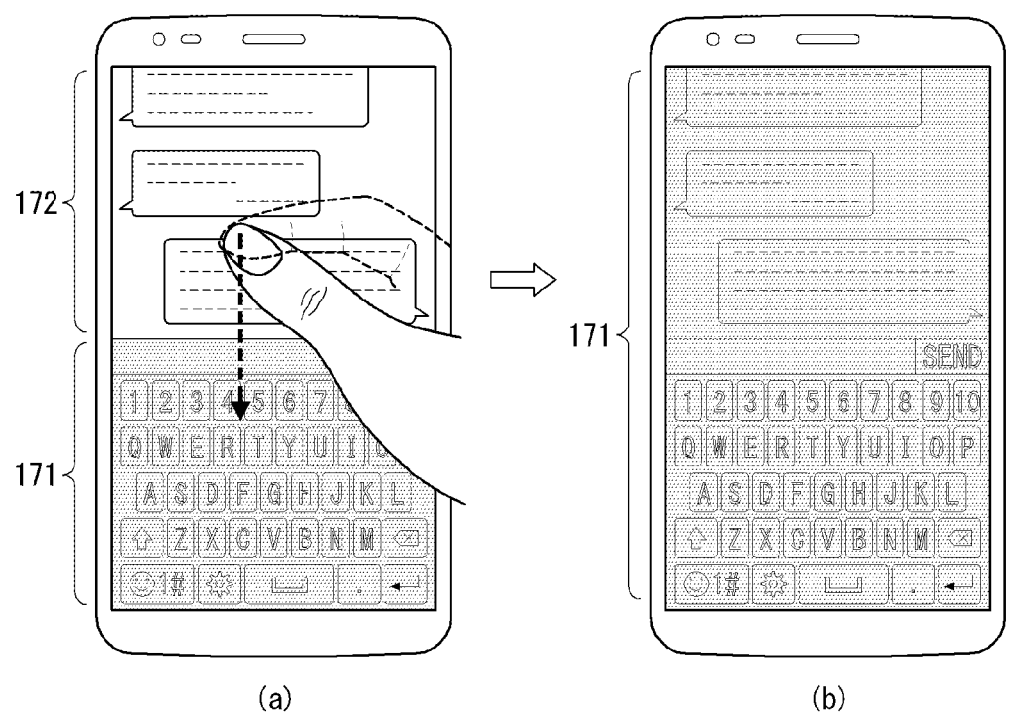

Referring to FIG. 35A, upon reception of drag input simultaneously applied to the front side and the rear side of the display 170 while the chat window in the messenger application execution screen is displayed in the opaque area 172 and the keypad is displayed in the transparent area 172, the entire area of the display 170 may be changed to a transparent area 171. Accordingly, both the chat window and the keypad may be displayed in the transparent area 171.

Figure 35B:
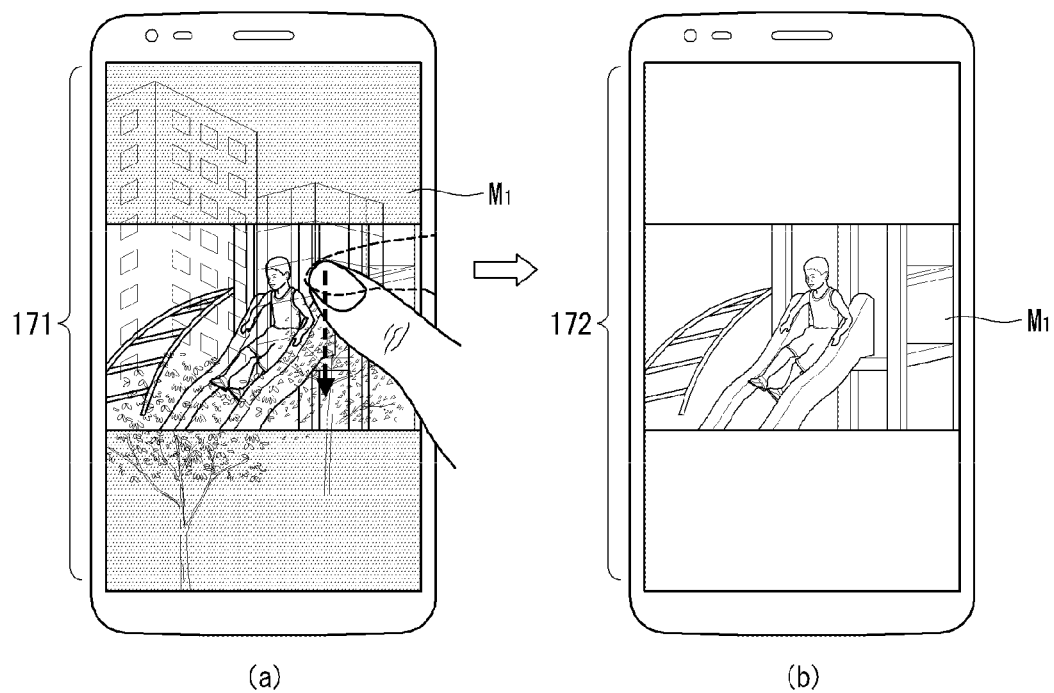

Referring to FIG. 35B, upon reception of drag input simultaneously applied to the front side and the rear side of the display 170 while a video is reproduced through the display 170 in a transparent state, the controller 180 may change an area M1 displaying the video and other area to an opaque area 172.

Examples of manually controlling the transparency of the display 170 through user touch interaction during execution of a predetermined application through the display 170 having controllable transparency have been described.

Figure 36A:
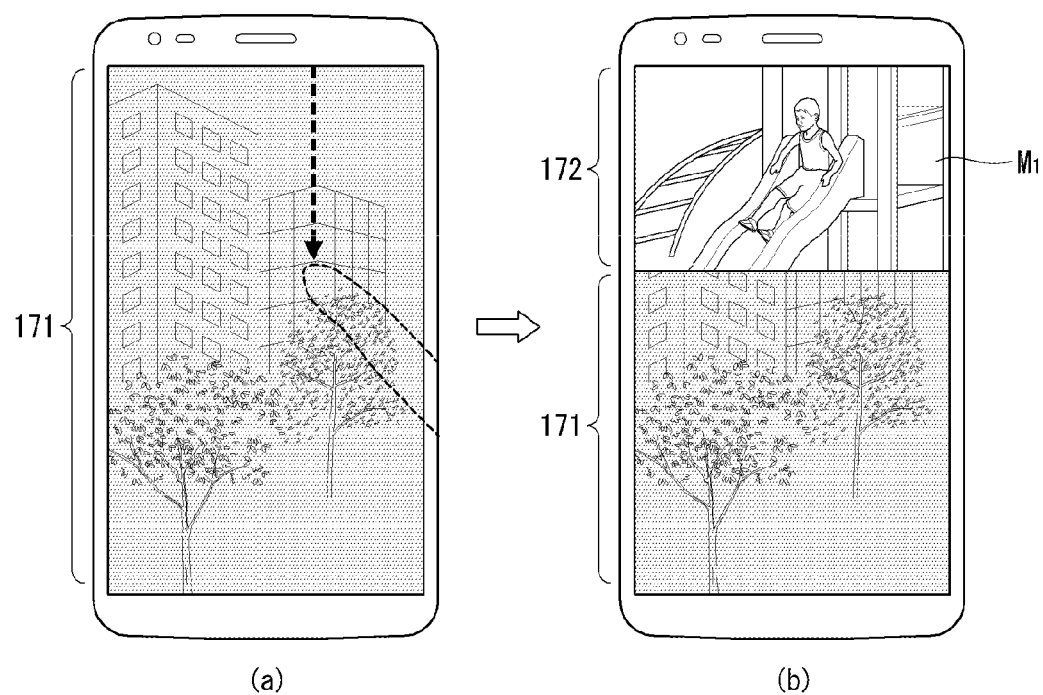
FIGS. 36A and 36B are diagrams for explaining operations of the mobile terminal according to a fourth embodiment of the present disclosure.
Figure 36B:
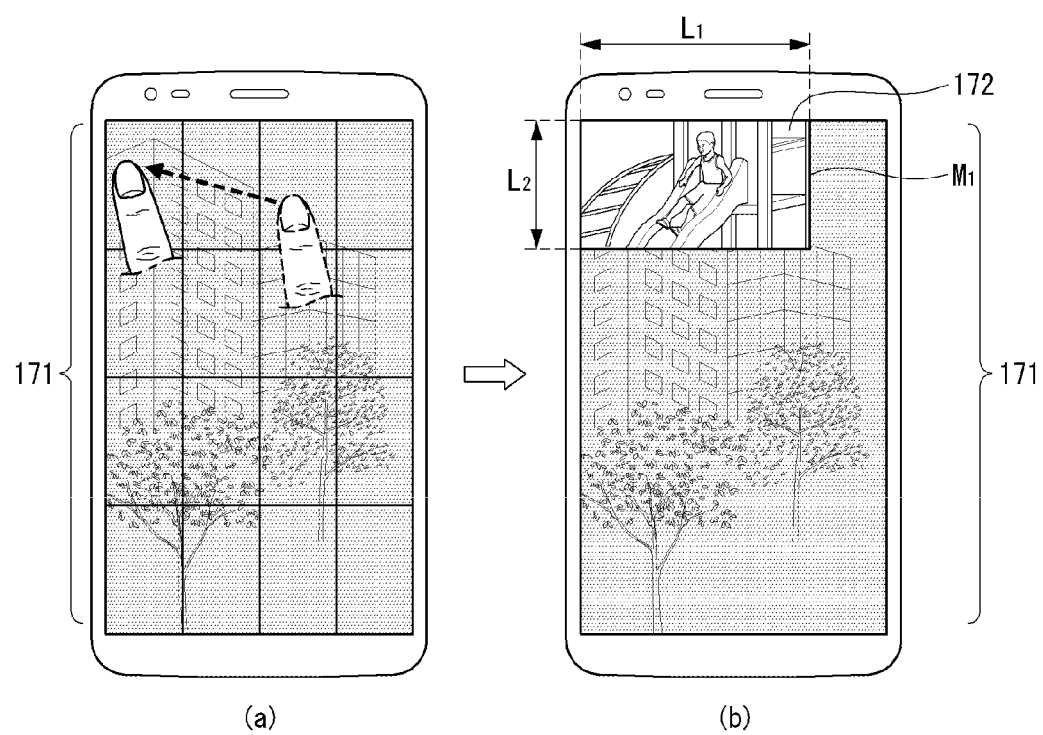

FIGS. 36A and 36B are diagrams for explaining operations of the mobile terminal according to a fourth embodiment of the present disclosure The fourth embodiment of the present disclosure describes examples of displaying content in an opaque area in response to the size of the content when part of the display area of the display 170 has been changed to the opaque area.

Referring to FIG. 36A, upon reception of drag input having a first length, which is applied to the rear side of the display 170 in a transparent state, an area corresponding to the first length is changed to an opaque area 172. When predetermined multimedia content is executed in this state, the controller 180 may change the resolution of the multimedia content to be adapted to the size of the opaque area 172 and display the multimedia content in the opaque area 172.

Referring to FIG. 36B, upon reception of touch input applied to the transparent area 171 for a predetermined time, a grid indicating a plurality of uniform areas may be displayed on the display 170. The controller 180 may change an area having a horizontal length of L1 and a vertical length of L2 to an opaque area 172 through user touch interaction. Thereafter, when predetermined multimedia content is executed, the controller 180 may change the resolution of the multimedia content in response to the size of the opaque area 172 and display the multimedia content in the opaque area 172.

Figure 37A:
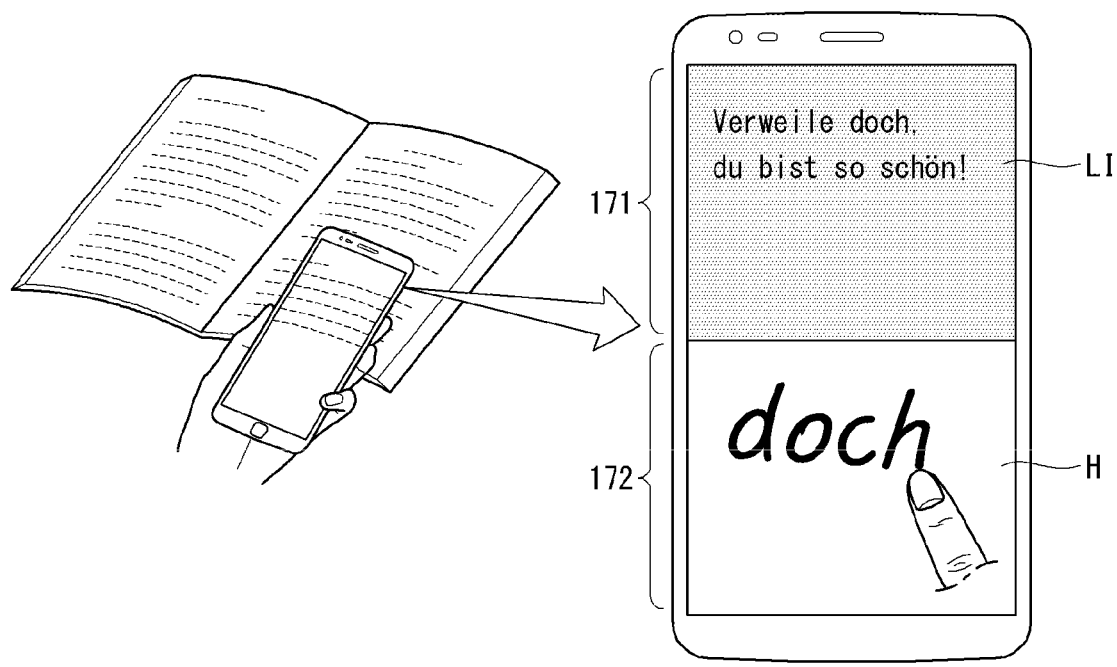
FIGS. 37A to 40 are diagrams for explaining examples of simultaneously using a transparent area and an opaque area of the display according to other embodiments of the present disclosure.
Figure 37B:
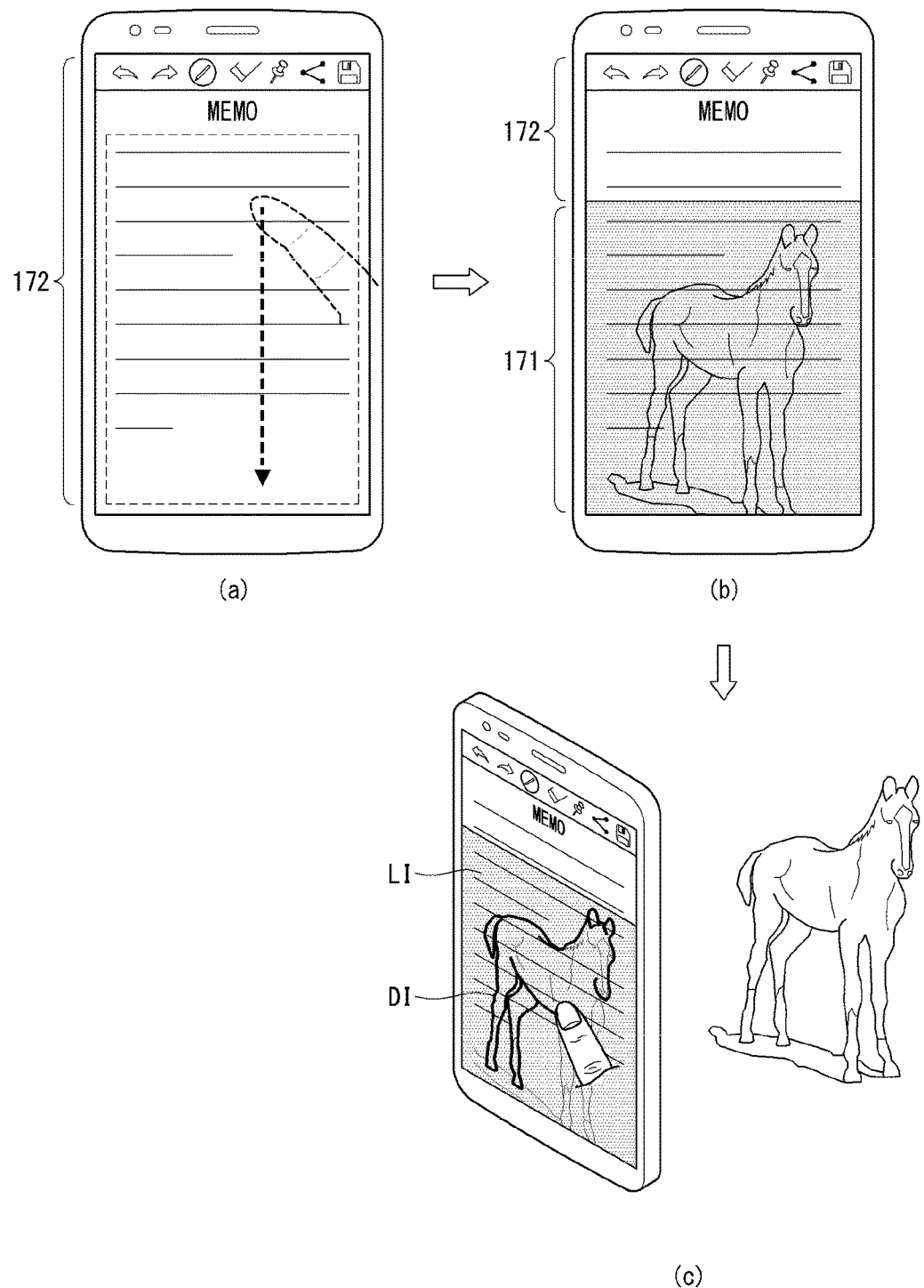

FIGS. 37A and 37B are diagrams for explaining operations of the mobile terminal according to a fifth embodiment of the present disclosure.

The fifth embodiment of the present disclosure describes examples of executing a drawing function using a state in which the rear of the mobile terminal is seen through the transparent display 170.

Referring to FIG. 37A, upon execution of a notepad application while the contents of a book placed behind the mobile terminal are viewed through the transparent display 170, the controller 180 may divide the display 170 into upper and lower parts, maintain the upper part as a transparent area 171 and change the lower part to an opaque area 172. Simultaneously, the controller 180 may provide a note input area according to execution of the note application to the opaque area 172. Accordingly, the user may input a note (such as handwriting) to the opaque area 172 with reference to the contents of the book seen through the transparent area 171.

The note application may include any application through which drawing input such as handwriting input of the user or input by a stylus pen can be applied.

Referring to FIG. 37B, upon reception of drag input starting at a point on the rear side of the display 170 after execution of the note application through the opaque area 172 (a), an area corresponding to the drag input may be changed to a transparent area 171 (b). Accordingly, the user may execute a drawing function DI using a rear view LI seen through the transparent area 171 (c).

Figure 38:
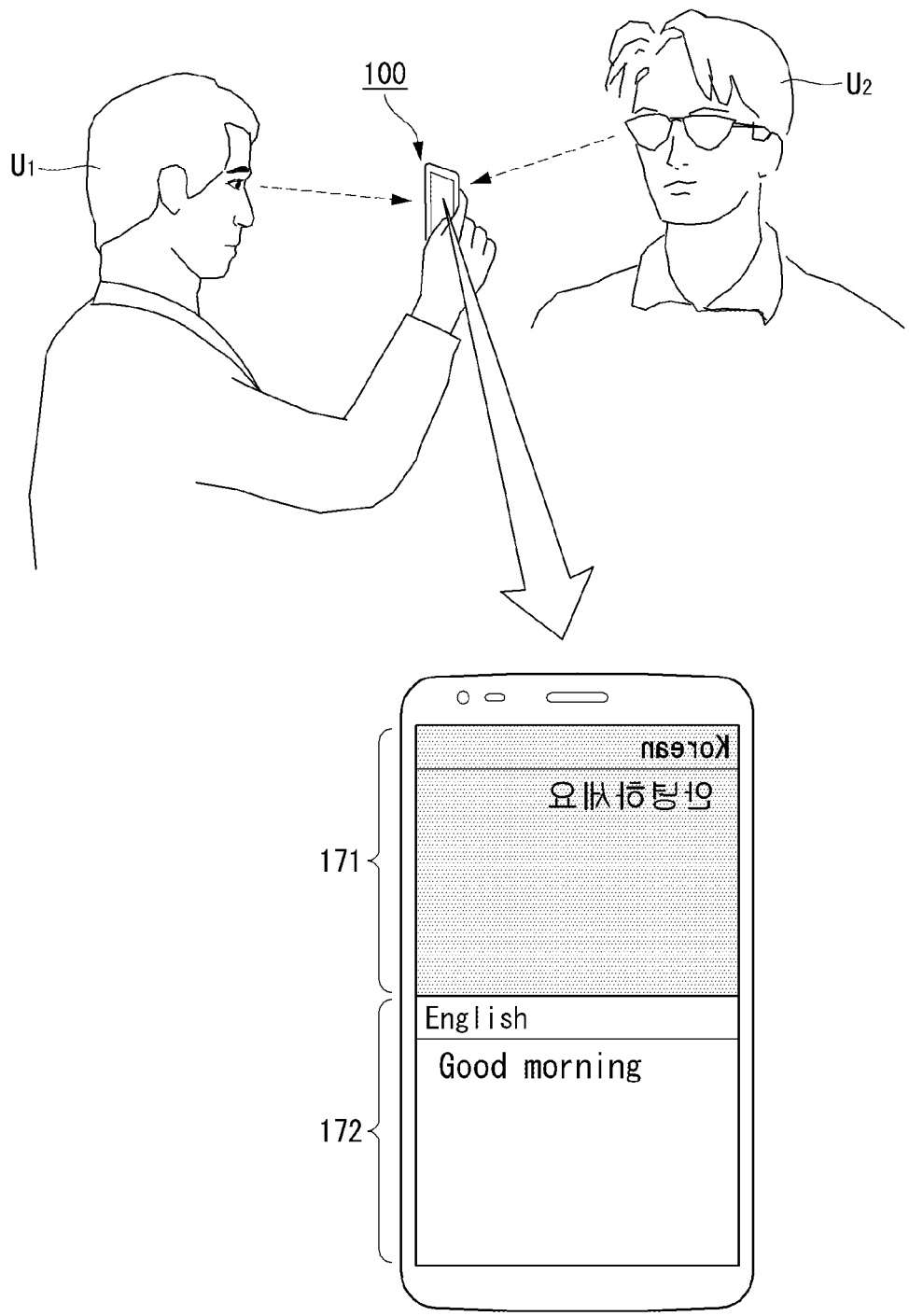
Figure 39A:
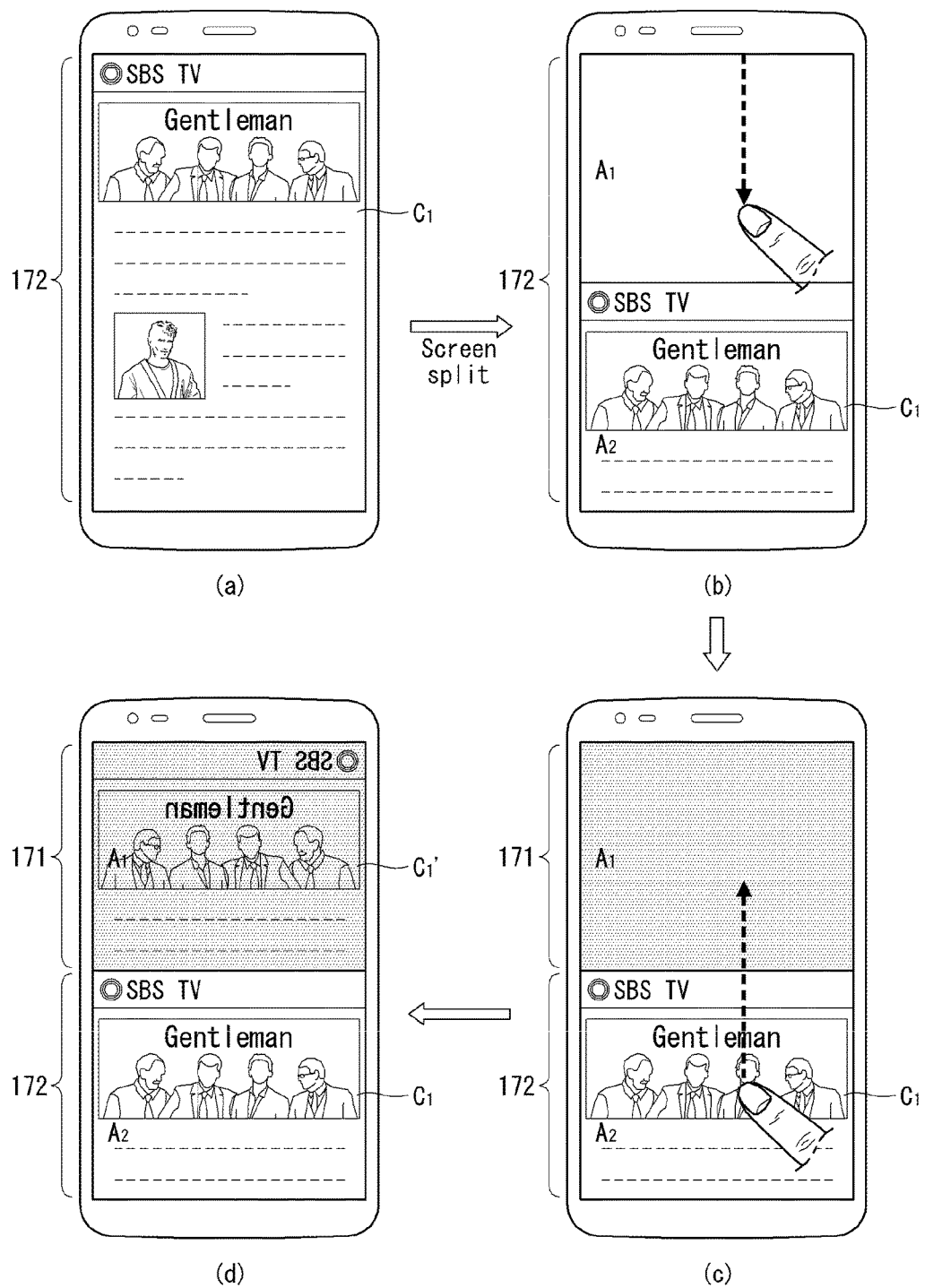
Figure 39B:
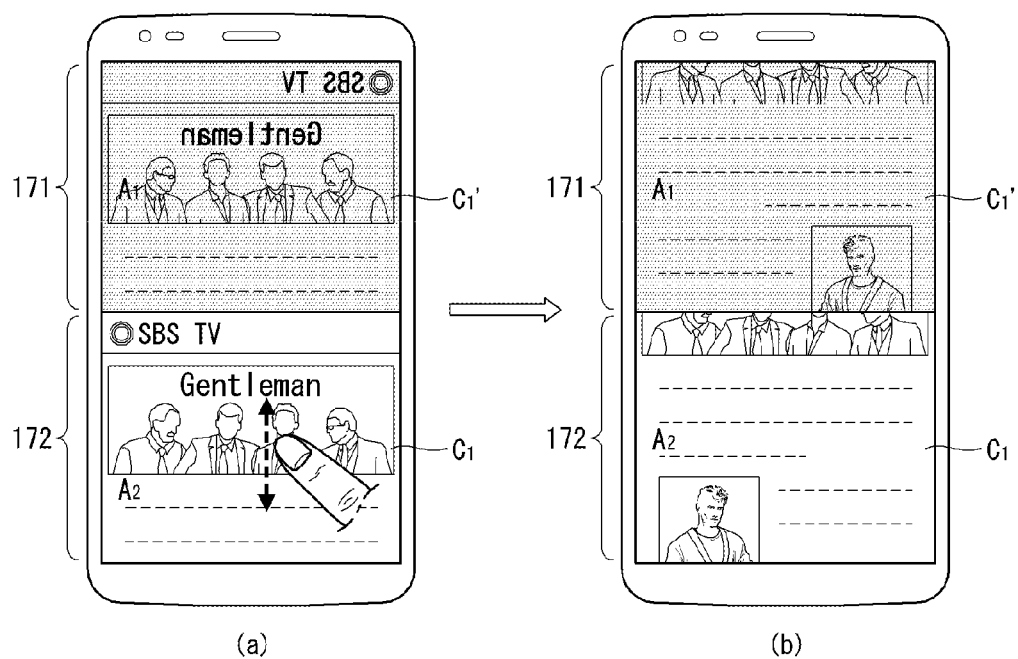
Figure 40:
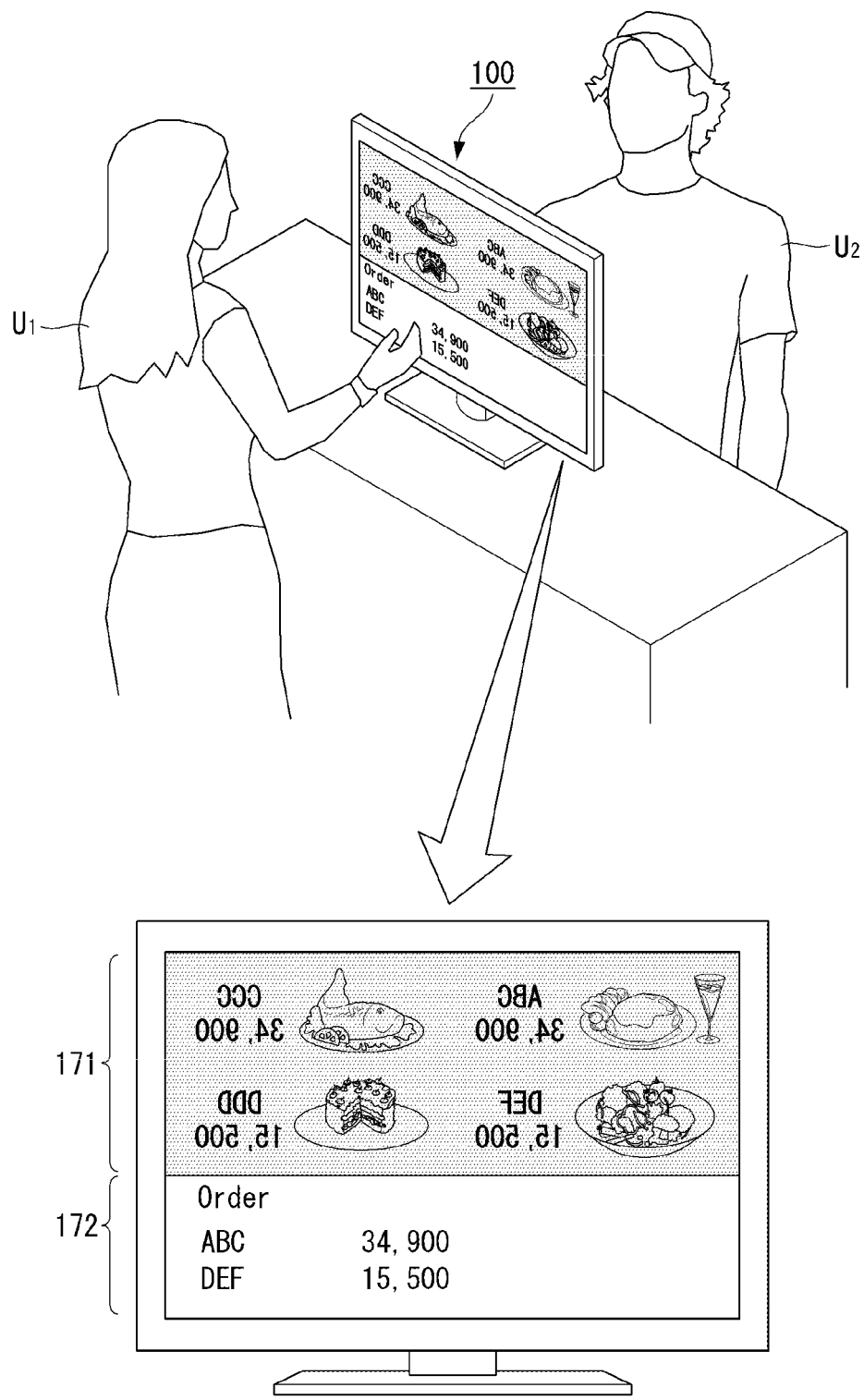

FIGS. 38 to 40 are diagrams for explaining operations of the mobile terminal according to a sixth embodiment of the present disclosure.

The sixth embodiment of the present disclosure relates to division of the display 170 into a transparent area 171 and an opaque area 172 and use of the areas. The controller 180 may display first information in the opaque area 172, reverse the first information and display the reversed first information in the transparent area 171. That is, the sixth embodiment enables a first user who views the front side of the display 170 and a second user who views the rear side of the display 170 to use content together through one mobile terminal 100.

Referring to FIG. 38, the controller 180 executes a translation application. The controller 180 provides first information to the opaque area 172, reverses second information corresponding to a result of translation of the first information and provides the reversed second information to the transparent area 171. Accordingly, the first user U1 gazing at the front side of the display 170 may confirm the first information and the second user U2 gazing at the rear side of the display 170 may confirm the second information.

Referring to FIG. 39A, the controller 180 displays first content C1 (e.g. a webpage) on the display (opaque area 172) in an opaque state (a).

The controller 180 divides the screen of the display 170 into a first area A1 and a second area A2 upon reception of predetermined input. Both the first area A1 and the second area A2 are opaque and the first content C1 is displayed over the first area A1 and the second area A2. Then, the controller 180 receives drag input starting at the first area A1. The controller 180 changes the first area A1 to a transparent area 171 and maintains the second area A2 as an opaque area 172. In addition, the controller 180 may move the first content C1 to the second area A2 or reduce the first content C1 to the size of the second area A2 and display the reduced first content C1 in the second area A2 (b).

Here, the first area 171 may be kept blank.

The controller 180 receives drag input for moving the first content C1 displayed in the opaque area 172 to the transparent area 171 (c).

The controller 180 may reverse the first content C1 and display the same in the transparent area 171. Accordingly, the first user gazing at the front side of the display 170 may view the first content C1 through the opaque area 172 and the second user gazing at the rear side of the display 170 may view the first content C1' through the transparent area 171 (d).

Referring to FIG. 39B, when the controller 180 receives a control signal for controlling display of the first content C1 displayed in the opaque area 172, the control signal may be equally applied to the first content C1' displayed in the transparent area 171.

For example, the first content C1 may be a webpage provided according to execution of a web browser. The control signal may be a command for scrolling the webpage. However, the present disclosure is not limited thereto. For example, the first content C1 may be a multimedia content reproduction screen. That is, users respectively located in front of and behind the display may view multimedia content through one device. This may be achieved by changing at least part of the display 170 into a transparent state and changing the other part into an opaque state.

Referring to FIG. 40, the controller 180 may reverse information and display the reversed information in the transparent area 171. In addition, the controller 180 may display information related to an object selected from the information displayed in the transparent area 171 in the opaque area 172. For example, the controller 180 may reverse and display a product menu in the transparent area 171 and display menus through which a seller U1 executes a calculation function for a product ordered by a customer U2.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A mobile terminal comprising:
   a display including a first side and a second side, wherein the display is configured to receive touch input at the first side;
   a shielding layer that is, in part or fully, coupled to the second side of the display and that includes a plurality of shielding areas, wherein transparency of each shielding area is adjustable; and
   a controller configured to change transparency of a first shielding area of the plurality of shielding areas, wherein the first shielding area is associated with the touch input,
   wherein the shielding layer includes:
   a first film that forms a first surface of the shielding layer,
   a second film that forms a second surface of the shielding layer, a first conductive layer and a second conductive layer that are coupled between the first film and the second film, and a discoloration layer that is coupled between the first conductive layer and the second conductive layer, the discoloration layer including a liquid crystal element, wherein the liquid crystal element is configured to be arranged in response to a control signal induced from the touch input such that the shielding layer has a transparent state or an opaque state, wherein the display is configured to receive continuous touch input at (i) the first side, (ii) the second side, or (iii) at both the first side and the second side, wherein the continuous touch input is touch input that maintains contact on the display while the continuous touch input moves from a first position on the display to a second position on the display, wherein the controller is configured to:

determine a length between the first position and the second position;

determine whether the length between the first position and the second position satisfies a threshold; and change, based on the determination that the length between the first position and the second position satisfies the threshold, transparency of one or more shielding areas of the plurality of shielding areas that are associated with the continuous touch input.

2. The mobile terminal of claim 1, wherein the controller is configured to provide, to the display, a grid dividing the display into a plurality of sub-areas, wherein the grid indicates borders of the plurality of shielding areas.

3. The mobile terminal of claim 2, wherein each of the plurality of shielding areas is substantially equal in size and shape, and wherein each of the plurality of shielding areas is mapped to each of the plurality of sub-areas.

4. The mobile terminal of claim 3, wherein the controller is configured to:

determine content that is provided to the display; and
change mapping between each of the plurality of shielding areas and each of the plurality of sub-areas based on the content provided to the display.

5. The mobile terminal of claim 1, wherein the controller is configured to change, in response to the continuous touch input that is received by both the first side and the second side, transparency of all of the plurality of shielding areas.

6. The mobile terminal of claim 1, wherein the controller is configured to:

provide, to the display, visual graphics that are displayed while continuous touch input is made from a first position on the display to a second position on the display, wherein the visual graphics are displayed in an area that is associated with the first position and the second position, and wherein the continuous touch input is touch input that maintains contact on the display while the touch input moves from the first position to the second position.

7. The mobile terminal of claim 1, wherein the display is configured to receive continuous touch input, wherein the continuous touch input is touch input that maintains contact on the display while the continuous touch input is made, and wherein the controller is configured to change transparency of a second shielding area of the plurality of shielding areas based on a direction of the continuous touch input, and wherein the second shielding area is associated with the continuous touch input .

8. The mobile terminal of claim 1, wherein the controller is configured to:

identify information that is displayed on the display; and
change transparency of one or more shielding areas of the plurality of shielding areas based on the information.

9. The mobile terminal of claim 8, wherein the information includes mobile terminal state information.

10. The mobile terminal of claim 8, wherein the information includes information provided by a first application.

11. The mobile terminal of claim 8, wherein the information includes information that is communicated between the mobile terminal and an external device.

12. The mobile terminal of claim 8, wherein the information includes personal security information.

13. The mobile terminal of claim 1, further comprising an illumination sensor that is configured to sense brightness, wherein the controller is configured to:
obtain brightness information from the illumination sensor, and
change transparency of one or more shielding areas of the plurality of the shielding areas based on the brightness information.

14. The mobile terminal of claim 1, wherein the display is configured to display information, and wherein the controller is configured to:
identify transparency of one or more shielding areas of the plurality of shielding areas, wherein the one or more shielding areas are associated with the information, and
reverse the information that is displayed on the display based on the transparency of the one or more shielding areas.

15. The mobile terminal of claim 1, wherein the display is substantially transparent.

16. The mobile terminal of claim 1, wherein transparency of each shielding area is independently adjustable.

* * * * *